US012063945B2

(12) United States Patent
Festring et al.

(10) Patent No.: US 12,063,945 B2
(45) Date of Patent: *Aug. 20, 2024

(54) CHOCOLATE PRODUCTS, INGREDIENTS, PROCESSES AND USES

(71) Applicant: SOCIETE DES PRODUITS NESTLE S.A., Vevey (CH)

(72) Inventors: Daniel Festring, York (GB); Beatrice Kuschel, York (GB); Joselio Batista Vieira, York (GB)

(73) Assignee: Societe des Produits Nestle S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,298

(22) Filed: Apr. 7, 2022

(65) Prior Publication Data

US 2022/0225632 A1 Jul. 21, 2022

Related U.S. Application Data

(63) Continuation of application No. 16/496,566, filed as application No. PCT/EP2019/052546 on Feb. 1, 2019, now Pat. No. 11,369,122.

(30) Foreign Application Priority Data

| Feb. 2, 2018 | (EP) | .................................... 18154926 |
| Apr. 6, 2018 | (EP) | .................................... 18166122 |
| Jun. 15, 2018 | (EP) | .................................... 18178071 |
| Dec. 13, 2018 | (EP) | .................................... 18212466 |
| Dec. 13, 2018 | (WO) | ................. PCT/EP2018/084842 |
| Dec. 13, 2018 | (WO) | ................. PCT/EP2018/084848 |

(51) Int. Cl.
*A23G 1/00* (2006.01)
*A23G 1/40* (2006.01)
*A23G 1/42* (2006.01)
*A23G 1/48* (2006.01)
*A23L 33/20* (2016.01)

(52) U.S. Cl.
CPC ............... *A23G 1/002* (2013.01); *A23G 1/40* (2013.01); *A23G 1/423* (2013.01); *A23G 1/48* (2013.01); *A23L 33/20* (2016.08)

(58) Field of Classification Search
None
See application file for complete search history.

(56) References Cited

U.S. PATENT DOCUMENTS

| 3,397,061 A | 8/1968 | Katz |
| 4,206,245 A | 6/1980 | Drevici et al. |
| 4,289,790 A | 9/1981 | Bruelle |
| 2011/0070332 A1 | 3/2011 | Bernaert et al. |
| 2013/0316056 A1 | 11/2013 | Parducci et al. |
| 2016/0066593 A1 | 3/2016 | Nielsen et al. |

FOREIGN PATENT DOCUMENTS

| BR | 10 2013 005053-9 | 11/2014 |
| BR | 122020024473-9 | 6/2021 |
| EP | 3114939 | 1/2017 |
| EP | 3114942 | 1/2017 |
| JP | H0420272 A | 1/1992 |
| JP | 2014230490 A | 12/2014 |
| RU | 2269268 C2 | 2/2006 |
| WO | 2014157608 A1 | 10/2014 |
| WO | 2017044610 | 3/2017 |

OTHER PUBLICATIONS

Nascimento Da Silva Elias et al., "Nutritional value and antioxidant capacity of cocoa honey" (*Theobroma caco* L.) Food Sci. Technol, Campinas, 34(4): 755-759, Oct.-Dec. 2014.
Office Action Received for U.S. Appl. No. 16/499,524, mailed on Aug. 4, 2022, 12 Pages of Official Copy.
Russian Office Action for Appl No. 2019135293 dated Feb. 1, 2019.
Japanese Office Action for Appl No. 2019-551361 dated Aug. 23, 2022.
Sacred Chocolate Oragnic Heart of Cacao, 2019, 3 pages.
Cocoa Pulp Juice, 3 pages.
Gardener et al., "Cacao Pulp: its Not Just a Waste Product of Cocoa Anymore", Jun. 5, 2013, Nutritional Outlook, 2 pages.
Madre Chocolate's Triple Cacao: Chewy, Chocolaty and Completely Unique, Jan. 5, 2015, 1 page.
Superfood Ingredients Offers a Range of Nutritious, Organic and Raw Cacao Products Including Powder, Nibs, Beans, Butter as Well as Products From the Cacao Pulp Such as Puree, Freeze Dried Pulp Powder and Spray Dried Pulp Powder, 3 pages. Date Mar. 23, 2015—submitted in U.S. Appl. No. 16/496,566.
Cacao Extract & Powder, 2 pages. Date May 7, 2018—submitted in U.S. Appl. No. 16/496,566.
Organic Chocolate With Cacao Pulp, Mashpi Chocolate Artesanal, 2 pages. Date Feb. 25, 2017—submitted in U.S. Appl. No. 16/496,566.
Meersman et al., "Characterization and Degradation of Pectic Polysaccharides in Cocoa Pulp", Journal of Agricultural and Food Chemistry, 2017, pp. 9726-9734.
Declercq et al., "Process for Extracting Sugars from Cocoa Pulp", Research Disclosure database No. 582084, ,2012 , 8 pages.
Seo et ai., "Improvement of Starch Extraction Efficiency from Potato with Celiulase Family", Food Engineering Progress, vol. 20, Issue No. 1, 2016, pp. 78-83.
Sowbhagya et al., "Enzyme-Assisted Extraction of Flavorings and Colorants from Piant Materials", Critical Reviews in Food Science and Nutrition, vol. 50, 2010, pp. 146-161.
"National Centre for Biotechnology Education—Pectinase (Pectinex)", University of Reading, 2018, pp. 1-3.
Macedo et al., "Influence of Pectinolyttic and Cellulotyc Enzyme Complexes on Cashew Bagasse Maceration in Order to Obtain Carotenoids", Journal of Food Science and Technology, vol. 52, Issue No. 6, 2014, pp. 3689-3693.

(Continued)

*Primary Examiner* — Jyoti Chawla
(74) *Attorney, Agent, or Firm* — K&L Gates LLP

(57) ABSTRACT

The present invention provides the use of a composition obtainable from the pulp of a plant in the *theobroma* genus or an extract of said pulp, as an ingredient in a chocolate product.

8 Claims, 5 Drawing Sheets

(56) References Cited

OTHER PUBLICATIONS

European Third Party Observation dated Aug. 17, 2020 for App No. 19155155.5-1105.
Nascimento Da Silva et al. "Nutritional value and antioxidant capacity of "cocoa honey" (*Theobroma cacao* L.)" Food Science and technology, 2014, vol. 34, No. 4, pp. 755-759.
Balladares et al. "Physicochemical characterization of *Theobroma cacao* L. sweatings in Ecuadorian coast" Emir. J. Food Agric. 2016, vol. 28, issue 10, pp. 741-745.
Ohkuma et al. "New Method for Determining Total Dietary Fiber by Liquid Chromatography" Journal of AOAC International, 2000, vol. 83, No. 4, pp. 1013-1019.
Tapre et al. "Pectinases: Enzymes for fruit processing industry" International Food Research Journal, 2014, vol. 21, No. 2, pp. 447-453.
"Protection of Foods by Drying", Modern Food Microbiology, 2005, pp. 443-456.
DeClercq, Fabian, et al., Process for Extracting Sugars from Cocoa Pulp. Research Disclosure #582084 (2012).†
Macedo, Manuella, et al., Influence of pectinolyttic and cellulotyc enzyme complexes on cashew bagasse maceration in order to obtain carotenoids. J Food Sci Technol (Jun. 2015) 52(6):3689-3693.†
Office Action mailed Sep. 6, 2022 in U.S. Appl. No. 16/499,574.†

† cited by third party

| Example | Image |
|---|---|
| 15b |  |
| 16b |  |
| 17b |  |
| 18b |  |

CHOCOLATE PRODUCTS, INGREDIENTS, PROCESSES AND USES

CROSS REFERENCE TO RELATED APPLICATIONS

The present application is a continuation of U.S. patent application Ser. No. 16/496,566 filed Sep. 23, 2019, which is a National Stage of International Application No. PCT/EP2019/052546 filed Feb. 1, 2019, which claims priority to European Patent Application No. 18154926.2 filed Feb. 2, 2018, European Patent Application No. 18166122.4 filed Apr. 6, 2018, European Patent Application No. 18178071.9 filed Jun. 15, 2018, International Application No. PCT/EP2018/084848 filed Dec. 13, 2018, European Patent Application No. 18212466.9 filed Dec. 13, 2018, and International Application No. PCT/EP2018/084842 filed Dec. 13, 2018, the entire contents of which are incorporated herein by reference.

FIELD OF INVENTION

The present invention relates to the field of new chocolate products, new ingredients for use in said products and uses of the new ingredients.

Additionally, the present invention relates to fat based tropicalizing agents' compositions, to methods for the preparation thereof, to methods of tropicalizing chocolate or analogues thereof, and to chocolate or analogues of chocolate containing the tropicalizing agents. In particular, it relates to the use of enzymes in the methods of the invention and to their incorporation into tropicalizing agent compositions and products of the invention.

BACKGROUND

Whilst it is well known that the cocoa plant is harvested to produce cocoa seeds that are used to provide cocoa liquor, cocoa butter and cocoa powder, other portions of the cocoa pod are not utilised.

The cocoa pod consists of a husk, pulp and cocoa beans. The pulp is an aromatic, moist body that surrounds the pods.

In initial processing of the cocoa seed, the pulp is typically removed by fermentation and is hydrolysed by microorganisms. Hydrolysed pulp is known in the industry as "sweatings." During fermentation, the pulp provides the substrate for various microorganisms, which are essential to the development of chocolate flavour precursors, which are fully expressed later, during the roasting process. Although pulp is necessary for fermentation, often more pulp occurs than is needed.

Excess pulp has been used to produce cocoa jelly, alcohol and vinegar, nata, and processed pulp. By controlled fermentation and distillation, sweatings can be made into an alcoholic spirit containing over 40% ethanol. The alcohol produced can be further fermented to produce acetic acid.

Cocoa sweatings have been shown to be a suitable substrate for fermentation to produce nata, a product normally obtained from fermentation of coconut water.

Additionally, raw cacao pulp has been used to produce smoothies and other so-called "health" drinks.

However, there is no known use of the cocoa pulp or an extract thereof in non-added sugar confectionery, particularly chocolate products, and the present invention provides a novel product with advantageous properties.

Additionally, conventionally manufactured chocolate consists of sugars, cocoa solids and protein (usually from milk) homogeneously dispersed in fats and fatty substances originating from cocoa butter. Chocolate analogues contain other vegetable fats in partial/total replacement of the cocoa butter fat. Often the continuous fat phase also contains dairy fat.

Cocoa butter typically starts to soften at about 28° C., with consequent loss of the mechanical strength of the chocolate. This means that at the high ambient temperatures frequently encountered in tropical countries, chocolate becomes sticky or even runny. It tends to stick to the wrapper and fall apart when the wrapper is removed, leaving a semi¬liquid mass that can often only be eaten with a spoon if cleanliness is desired. Enrobed chocolate products typically lose integrity under these conditions, with their contents often leaking and individual units tending to stick together in the packaging. Chocolate also loses the 'snap' that is an important (and pleasurable) textural characteristic of chocolate stored and eaten under cooler conditions.

Attempts to produce a chocolate that is resistant to heat are numerous. Persons skilled in the art generally refer to methods to achieve chocolate or chocolate analogues that are heat resistant as to methods to tropicalize chocolate. The approaches most widely used can be divided two main groups: 1) incorporation of high-melting point fats; and 2) creation of a three-dimensional matrix or network of sugar crystals or protein particles that will act as a sponge and hold the fat—thus maintaining the structure of the product even on melting of the fat. Over the last century many different methods have been reported.

There are two major drawbacks to the use of high-melting fats in chocolate. Namely, that food regulations in many countries restrict the use of substitutes for cocoa butter in chocolate. Further, the high-melting point fats in chocolate-like products give an unpleasant waxy mouthfeel.

Many methods have been described for causing accretion of sugar crystals by adding water or a polyol to chocolate, as originally disclosed in DE 389 127 (1919). CH 409,603 (1962) describes the direct incorporation of water into liquid chocolate mass during production causing a rapid increase in viscosity. As a result, it is impossible to pour the material into moulds or use for enrobing.

EP0688506 describes the preparation of gels comprising polyol or polyol/water with gelling agents and alkali or alkali-earth metal salts. The gels are produced by heating to temperatures of 120° C. and are then frozen in liquid nitrogen, before addition to liquid chocolate. These prior art references have drawbacks such as the release of water into the chocolate mass, which occurs early in the process and is not retarded for long enough for the material to be used for typical enrobing processes; the dispersion and release of water is not under sufficiently fine control to avoid development of unpleasantly gritty textures in the final product; and/or activation or an inconveniently long storage time is required for full development of the structures required to provide stability.

Many of the processes are complex, or require additional steps in the production procedure, and/or require the use of emulsifiers and/or gelling agents. The use of such agents leads to disadvantageous organoleptic properties when the chocolate product is consumed.

These methods and many other methods apply the usage of non-"clean-label" ingredients, i.e. polyols that are not well received by the consumer.

The inventor has now surprisingly found that the use of the pulp of the present invention or an extract thereof achieves a tropicalizing effect on chocolate or chocolate analogues preferably when subjected to the activity of appropriate enzymes.

According to the disclosed invention, the composition of the present invention could be incorporated into liquid chocolate mass and act as a tropicalizing agent, improving heat resistance of the resultant chocolate, without any significant viscosity increase over normal processing times.

SUMMARY

The present invention relates to chocolate products that comprise a composition obtainable from the pulp or an extract of the pulp from the plant genus *theobroma*. The present invention also provides new compositions obtainable from the pulp from the plant genus *theobroma*. The present invention preferably provides a, preferably non-added sugar, chocolate product that comprises a composition obtainable from cocoa pulp or an extract of cocoa pulp.

The present invention provides the use of said composition obtainable from cocoa pulp or an extract of cocoa pulp as a sugar substitute for use in chocolate products.

The present invention provides advantageous properties in respect of a reduction, or entire removal, of added sugar, with the sweetness being provided from a natural source, that preferably also contains other components of the cocoa pod that contribute to the flavour of the chocolate.

Accordingly, the present invention provides an alternative for added sugars by providing naturally occurring sugars that are present in the source of cocoa mass, cocoa butter and/or cocoa powder.

Additionally, the present invention provides the use of a by-product of the chocolate manufacturing process that is typically discarded. Hence, the present invention provides advantages in respect of sustainability.

Hence, the present invention provides a composition that is obtained by a process comprising:
 a. treating cocoa pulp or an extract of cocoa pulp to reduce the polysaccharide content and/or treating cocoa pulp or an extract of cocoa pulp to adjust the pH,
 b. drying the product of step a).

The present invention also provides a process for producing a composition derived from cocoa pulp or an extract of cocoa pulp that comprises:
 a. treating cocoa pulp or an extract of cocoa pulp to reduce the polysaccharide content and/or treating cocoa pulp or an extract of cocoa pulp to adjust the pH,
 b. drying the product of step a).

The present invention also provides a process for producing a chocolate product, preferably chocolate, comprising the steps of:
 a. treating pulp from a plant in the *theobroma* genus, preferably cocoa pulp, or an extract of pulp from a plant in the *theobroma* genus, preferably cocoa pulp, to reduce the polysaccharide content and/or treating pulp from a plant in the *theobroma* genus, preferably cocoa pulp, or an extract of pulp from a plant in the *theobroma* genus, preferably cocoa pulp to adjust the pH,
 b. drying the product of step a., and
 c. combining the product of step b. with at least one other ingredient present in the chocolate product.

According to one aspect of the invention, there is provided the use of the pulp from a plant in the *theobroma* genus, preferably cocoa pulp, or an extract of pulp from a plant in the *theobroma* genus, preferably cocoa pulp, as a tropicalizing agent in a chocolate product.

In another aspect, the invention encompasses the use of a pre-treated (i.e. a treatment is carried out prior to incorporation into a chocolate product) as a tropicalizing agent. In a still further aspect, the invention encompasses a chocolate or chocolate analogue comprising a tropicalizing agent composition in an amount sufficient to increase the integrity, heat stability or shape retention of the chocolate or chocolate analogue.

The terms "tropicalization", "tropicalizing methods", and variations thereof as used herein, refer to methods and processes of the invention to achieve heat and shape resistance in chocolate or chocolate analogue products.

The term "tropicalized products", and variations thereof as used herein, refers to chocolate and chocolate analogue products of the invention which are endowed with heat and shape resistance.

Advantageously the tropicalizing agent composition of the present invention can be prepared from food ingredients and does not require the use of any emulsifying agent, gelling agent, nor other additive. Advantageously, the tropicalizing agent composition is suitable for use in chocolate, whereby food regulations in many countries restrict or forbid the addition of artificial additives to chocolate.

Advantageously, the present invention provides a chocolate product that exhibits improved shape stability at elevated temperatures above room temperature, e.g. at temperatures up to 40° C., and even at higher temperatures.

The chocolate product is dry to the touch and does not stick to its wrapper, or adopt the shape of the wrapper, even when exposed to temperatures above the melting range of the fat composition.

Advantageously good texture and organoleptic properties of regular chocolate are retained, which is not generally the case for tropicalized chocolates.

Additionally, as mentioned below, the pre-treatment of the pulp and/or pulp extracts of the present invention provides advantages in respect of processing conditions in manufacturing the chocolate product and organoleptic properties, e.g. mouthfeel, when compared to non-pre-treated, simply dried pulp.

Hence, the present invention solves the related issues of heat stability, processing difficulties and sensoral organoleptic properties without the need for additional additives to the chocolate products.

Specifically, the present invention provides the compositions, methods and uses described in the claims

DETAILED DESCRIPTION

Pulp

Figure 1:
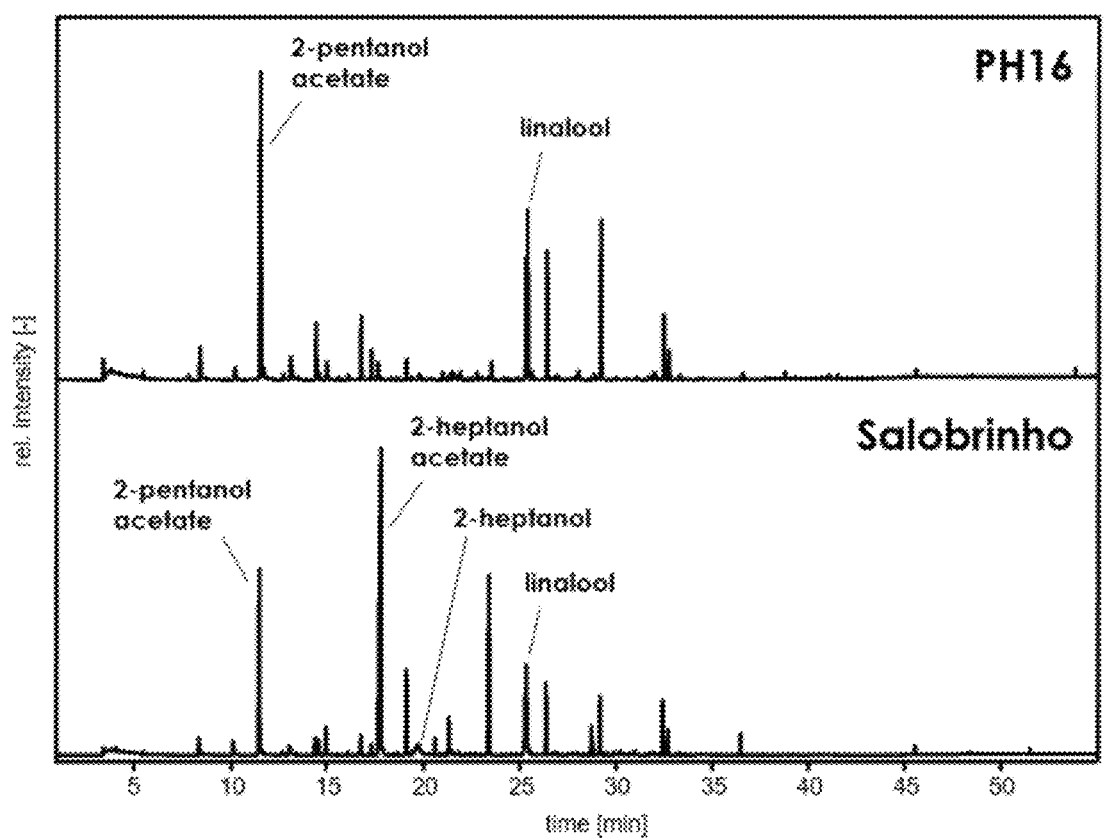
FIGS. 1 to 3 display GC-MS data for Examples 8 to 10
FIGS. 4, 5A and 5B display the results of bloom development from Example 20.

The pulp for use in the present invention is obtained from a plant or plants from the genus *Theobroma*, The plant genus comprises *Theobroma angustifolium, Theobroma bicolor* (mocambo), *Theobroma cacao, Theobroma canumanense, Theobroma grandiflorum* (cupuagu), *Theobroma mammosum, Theobroma microcarpum, Theobroma obovatum, Theobroma simiarum, Theobroma speciosum, Theobroma stipulatum Theobroma subincanum*, and *Theobroma sylvestre*. Preferably, the pulp is selected from cacao, cupuacu and mocambo and mixtures thereof, preferably cacao.

The embodiments described below are mentioned in respect of the preferred embodiment cocoa, but are equally applicable to pulp from all other plants in the genus *Theobroma*.

In the present invention, the term "pulp" relates to the mucilage-like coating around each bean. In the present invention, the term "cocoa pulp" also encompasses dried cocoa pulp, for example, in the form of a powder. However, where the term "dried cocoa pulp", for example, is used the cocoa pulp is limited to dried cocoa pulp. The origin of the cocoa pulp is not particularly limited and all known varieties of cocoa pod may provide the pulp. However, it is preferred that the sugar content of the cocoa pulp is as high as possible.

In the present invention, the term "extract" has the normal dictionary meaning, i.e. a portion of cocoa pulp comprising one or more components of cocoa pulp wherein one or more components of the original cocoa pulp have been removed to provide the extract. In the present invention, any water present in the cocoa pulp is not taken as being the extract, i.e. the cocoa pulp extract is not water. In an embodiment of the present invention, the cocoa pulp extract is in the form of a powder, i.e. the cocoa pulp extract has been dried to remove water.

It is a preferred embodiment of the present invention that the composition obtained from the cocoa pulp or cocoa pulp extract are dried. The remaining moisture contents are defined below.

In the embodiments described below, the cocoa pulp extracts are defined and the components described are of course present in the original cocoa pulp, i.e. are not added.

In an embodiment, the cocoa pulp extract may be a composition that is obtained by a process comprising:
a. treating cocoa pulp or an extract of cocoa pulp (this extract is different from the extract prepared by this process) to reduce the polysaccharide content and/or treating cocoa pulp or an extract of cocoa pulp to adjust the pH,
b. drying the product of step a).

In a preferred embodiment of the present invention, cocoa pulp is treated by the above defined process to provide a composition that is a cocoa pulp extract. Accordingly, in the present application below the term "cocoa pulp extract" is used to encompass but is not limited to the composition obtained from the process of the invention, i.e. the composition of the invention may preferably be considered as cocoa pulp extract.

In an embodiment, the pulp of the present invention is not fermented.

In a preferred embodiment, the pulp of the present invention is treated in steps a. and/or b. in the absence of any beans from the plants of the *theobroma* genus. In a preferred embodiment, the treated pulp is not mixed with beans, preferably whole beans, from the plants of the *theobroma* genus. In a preferred embodiment, the treated pulp is not mixed with beans, preferably whole beans, from the plants of the *theobroma* genus. In a preferred embodiment, the treated pulp is not mixed with nibs from the plants of the *theobroma* genus.

In a preferred embodiment, the cocoa pulp of the present invention is treated in steps a. and/or b. in the absence of whole cocoa beans and/or cocoa nibs. In an embodiment of the present invention, provided is an extract of cocoa pulp that comprises sugar.

In an embodiment, the sugar comprises monosaccharides (e.g. fructose, fucose, galactose, glucose and/or rhamnose), disaccharides (e.g. lactose, maltose and/or sucrose) and/or oligosaccharides (e.g. less than 20, less than 10 or less than 8 saccharide units) and it is here defined as "cocoa sugar". Preferred sugars present in the cocoa pulp or cocoa pulp extract include sucrose, glucose or fructose and mixtures thereof.

In an embodiment, the cocoa pulp extract sugar comprises sugars selected from the group consisting of glucose, sucrose and fructose and combinations thereof, and it is here defined as "cocoa sugar". The cocoa sugar may vary in content and nature based on the variety of the cocoa pod.

In an embodiment of the present invention, the cocoa pulp extract or dried cocoa pulp comprises between 20.0% and 100% by weight of cocoa sugar based on the total weight of the extract or pulp, more preferably between 30.0% and 99.75%, more preferably between 30.0% and 99.50%, more preferably between 30.0% and 99.25%, and more preferably between 40.0% and 95.0%.

In embodiments of the present invention, for example, the cocoa pulp extract or dried cocoa pulp contains between 50.0% and 95.0% by weight of cocoa sugar based on the total weight of the extract or pulp, more preferably between 60.0% and 95.0%, more preferably between 65.0% and 90.0%, more preferably between 65.0% and 85.0%, more preferably between 65.0% and 80.0%.

In an embodiment, the cocoa sugar in the cocoa pulp extract or dried cocoa pulp comprises a significant amount of sucrose, preferably a majority of sucrose. In an embodiment, the sucrose content of the sugar component is greater than 35.0% by weight based on the weight of the sugar component (i.e. the total sugar content), more preferably greater than 40.0%, more preferably greater than 45.0%, more preferably greater than 50.0% more preferably greater than 55.0%, and more preferably greater than 60.0%.

In an embodiment, the cocoa sugar component comprises less than 90.0% by weight of the sugar component of sucrose, preferably less than 85.0%, more preferably less than 80.0%, more preferably less than 75.0%.

In the above embodiments, the cocoa sugar comprises glucose, fructose or a mixture of glucose and fructose, preferably the sum of glucose, fructose and sucrose equates to greater than 95.0% by weight of the cocoa sugar component, more preferably greater than 97.5%, more preferably greater than 98.5%, more preferably greater than 99.0% and more preferably 100%.

In an alternative embodiment, the cocoa sugar in the cocoa pulp extract or dried cocoa pulp comprises a significant amount of glucose and fructose, preferably a majority of glucose and fructose. In an embodiment, the glucose and fructose content of the sugar component is greater than 45.0% by weight based on the weight of the sugar component, more preferably greater than 50.0%, and more preferably greater than 55.0%. For example, greater than 65.0%, greater than 75.0%, greater than 80.0%, or greater than 85.0%.

In an embodiment, the cocoa sugar component consists of 100%, or comprises less than 99.0% by weight of glucose and fructose, preferably less than 95.0%. For example, less than 92.0%, less than 90.0%, less than 87.0%, less than 85.0%, or less than 75.0%.

In an embodiment, the cocoa sugar component comprises between 45.0% and 100% of a combination of glucose and fructose based on the weight of the sugar component, preferably between 55.0% and 100% and preferably between 60.0% and 100% or between 80.0% and 99.0%.

In an embodiment, the fructose content of the sugar component is greater than 15.0% by weight based on the weight of the sugar component (i.e. the total sugar content), more preferably greater than 20.0%, more preferably greater than 25.0%, more preferably greater than 30.0% more greater than 35.0%, and greater than 40.0%.

In an embodiment, the cocoa sugar component comprises less than 75.0% by weight of the sugar component of fructose, preferably less than 70.0%, more preferably less than 65.0%, more preferably less than 60.0%.

In a n embodiment, the cocoa sugar component comprises between 20.0% a nd 75.0% by weight of fructose, preferably between 30.0% and 60.0%.

In an embodiment, the glucose content of the sugar component is greater than 15.0% by weight based on the weight of the sugar component (i.e. the total sugar content), more preferably greater than 20.0%, more preferably greater than 25.0%, more preferably greater than 30.0% more greater than 35.0%, and greater than 40.0%.

In an embodiment, the cocoa sugar component comprises less than 75.0% by weight of the sugar component of glucose, preferably less than 70.0%, more preferably less than 65.0%, more preferably less than 60.0%.

In an embodiment, the cocoa sugar component comprises between 20.0% and 75.0% by weight of glucose, preferably between 30.0% and 60.0%.

In the above embodiments, the remainder of the cocoa sugar comprises sucrose, preferably the remainder of the sugar comprises sucrose, lactose, maltose, galactose or combinations thereof.

In a preferred embodiment, the sugar component of the cocoa pulp or cocoa pulp extract comprises between 0.10% and 50.0% or between 5.0% and 50.0% by weight of sucrose and the sugar component constitutes between 20.0% and 100% by weight of the cocoa pulp or cocoa pulp extract, preferably the cocoa pulp or cocoa pulp extract is dried.

In a preferred embodiment, the sugar component of the cocoa pulp or cocoa pulp extract comprises between 45.0% and 100.0% or between 45.0% and 99.0% by weight of fructose and glucose and the sugar component constitutes between 20.0% and 100% by weight of the cocoa pulp or cocoa pulp extract, preferably the cocoa pulp or cocoa pulp extract is dried.

In a preferred embodiment, the above sugar contents are obtained using HPAEC-PAD (High-Performance Anion-Exchange Chromatography with Pulsed Amperometric Detection). A preferred analysis method is defined in the examples section.

In an embodiment of the present invention, the cocoa pulp extract comprises further components selected from the list comprising of fibres, hydrocolloids, proteins, acids, polyphenols, phenolic-polymers, polysaccharides, methylxanthines and anti-oxidants (other
than those encompassed by the other components listed). In a preferred embodiment, these are intrinsic components of the cocoa pulp and are not added separately.

In an embodiment of the present invention, the cocoa pulp extract comprises components selected from the list consisting of phenolic acids, catechin, epicatechin, and proanthocyanidins.

In an embodiment of the present invention, the cocoa pulp extract comprises pectin. In an embodiment, as discussed below, the cocoa pulp is treated to remove, preferably partially or essentially all, pectin and optionally to, preferably partially, remove other polysaccharides.

In an embodiment of the present invention, the cocoa pulp extract comprises lignin.

In an embodiment of the present invention, the cocoa pulp extract comprises cellulose or hemicellulose and a combination thereof. In an embodiment, as discussed below, the cocoa pulp is treated to remove, preferably partially or essentially all, cellulose or hemicellulose and a combination thereof and optionally to, preferably partially, remove other polysaccharides.

In an embodiment of the present invention, the cocoa pulp extract comprises components selected from the list consisting of caffeine, theobromine, and theophylline.

In an embodiment of the present invention, the cocoa pulp extract comprises an acid selected from the group consisting of citric acid, malic acid, tartaric acid and ascorbic acid and combinations thereof.

In an embodiment of the present invention, the fibre comprises dietary fibre.

In a preferred embodiment, the dietary fibre comprises insoluble and soluble dietary fibre.

In a preferred embodiment, the insoluble dietary fibre comprises cellulose, hemicellulose or a combination thereof. In a preferred embodiment, the soluble dietary fibre comprises pectin.

In a preferred embodiment, the average degree of polymerisation of the dietary fibre, preferably the insoluble and soluble components together, is greater than 12, preferably greater than 20, preferably greater than 30 and preferably greater than 40. In an embodiment, the average degree of polymerisation of the dietary fibre is less than 100, preferably less than 75. For example, between 40 and 75. In an embodiment, the average degree of polymerisation is obtained using SEC-MALS (Size Exclusion Chromatography—Multi Angle Light Scattering), for example, the sample was partially dissolved in DMSO.

In an embodiment, the dried pulp or pulp extract comprises between 0.0% and 80.0% by weight of dietary fibre based on the total weight of the extract or pulp, between 0.25% and 70.0%, between 0.5% and 70.0%, between 0.75% and 60.0%, and more preferably between 5.0% and 60.0%.

In an embodiment, the above percentages relate to dried pulp or extracts of pulp that have not been pre-treated by the methods of the present invention. In a preferred embodiment, the amount of dietary fibre in the dried pulp or pulp extract comprises lower amounts of dietary fibre owing to the treatment to reduce the content of polysaccharides, preferably a treatment with a cellulase and/or a pectinase. As mentioned below, the reduction in the amount of polysaccharides by the treatment of the present invention breaks down larger polysaccharides into smaller polysaccharides, oligosaccharides (preferably 3-8 saccharides or 3-10 saccharides), and/or di/mono-saccharides.

Accordingly, in an embodiment of the present invention, the dried pulp or extract of pulp, comprises less than 30.0% by weight of the dietary fibre based on the weight of the dried pulp or extract of pulp; preferably less than 20.0% by weight, preferably less than 15.0% by weight, or preferably less than 10.0% by weight, less than 5.0% by weight, or less than 2.5% by weight. For example, between 0.0% and 20.0% by weight of dietary fibre, or between 0.25% and 10.0% by weight of dietary fibre or between 0.25% and 5.0% by weight of dietary fibre.

In an embodiment, the total dietary fiber, and its fractions, in dried pulp or dried pulp extract is measured by the enzymatic-gravimetric method Rapid Integrated Total Dietary Fiber method as described in Journal of AOAC International, Volume 102, Number 1, January-February 2019, pp. 196-207(12).

In an embodiment of the present invention, the cocoa pulp extract comprises a fibre component and an acid component, wherein the amount of fibre component is lower than the sugar component by 30% weight or more of the pulp extract.

Accordingly, in an embodiment of the present invention, the dried pulp or extract of pulp comprises (all % are by weight of the dried pulp or extract) between 20.0% and 100% by weight of sugar consisting of monosaccharides, disaccharides and/or oligosaccharides; between 0.0% and 80.0% by weight of dietary fibre; between 0.0% and 10% of an acid component, and between 0.0% and 10% by weight of water. In a preferred embodiment, the dietary fibre component is less than 20% by weight, preferably less than 5.0%.

In an embodiment, the chocolate products of the present invention comprise additional components derived from the cocoa pod, for example, the products comprise cocoa powder or cocoa husk fibre (soluble and insoluble dietary fibre). In an embodiment, the additional components are provided as a carrier for the cocoa pulp or cocoa pulp extract. In an embodiment, the additional components are combined with the cocoa pulp or cocoa pulp extract prior to the preparation of the compositions of the invention.

In an embodiment of the present invention, the cocoa pulp extract, a dried cocoa pulp extract or the dried cocoa pulp comprises less than 10.0% by weight of water, preferably less than 8.0%, more preferably less than 5.0%, more preferably less than 2.0%, and more preferably less than 1.0%. In an embodiment, it noted that entire dehydration is potentially not achievable, thus, the water content is optionally greater than 0.1%, greater than 0.5% or greater than 1.0%.

In an embodiment of the present invention, the chocolate product comprises between 0.1% and 5% by weight of water based on the weight of the chocolate product, preferably between 0.5% and 4.5% by weight, more preferably between 0.75% and 3.5% by weight and more preferably between 1.0 and 3.0% by water and most preferably between 1.5% and 2.75%.

In a preferred embodiment, the water contents above may be measured using Karl Fischer analysis, for example, by the methods specified in the examples.

In an embodiment of the present invention, the cocoa pulp extract is prepared by a process that comprises removing the cocoa pulp from the cocoa pod, thermally treating, optionally concentrating, and drying the cocoa pulp.

In an embodiment, the cocoa pulp is removed from the cocoa pod, for example, by the process of EP0442421 (Nestle SA). An alternative means of removing the cocoa pulp from the cocoa pods in an embodiment of the present invention is the use of a commercially available pulper, preferably fitted with brushes.

In the above embodiment, the thermal treatment step relates to treatment at high temperatures (typically 120° G to 160° G) for a very short period (typically no more than 200 seconds and optionally typically more than 50 seconds) to deactivate any microbial contaminants to make the ingredient safe for human consumption. Alternatively, different temperatures may be used, for example, 80° C. to 100° C., and different times, for example 10 to 25 seconds. The thermal treatment step is not particularly limited, as long as pasteurisation occurs without product degradation.

In an embodiment, the drying is preferably carried out using spray drying, vacuum drying, drum drying, oven-drying, foam drying, tray drying, fluid bed drying, crystallization drying (preferably using a seed crystal of sugar) or freeze-drying (lyophilization).

In an embodiment, the drying takes place at greater than 45° C., preferably greater than 50° C. preferably greater than 55° C. and greater than 60° C. In an embodiment, the drying takes place at less than 125° C., preferably less than 100° C., preferably less than 90° C. and preferably less than 85° C. or less than 80° C. In a preferred embodiment, the drying takes place between 45° C. and 100° C. and more preferably between 45° C. and 85° C.

In an embodiment, the drying takes place for greater than 1 hour, preferably greater than 5 hours, preferably greater than 10 hours, greater than 15 hours or greater than 20 hours. In an embodiment, the drying takes place for less than 72 hours, preferably less than 60 hours, preferably less than 50 hours or less than 40 hours.

In a preferred embodiment, the drying takes place between 45° C. and 125° C. and between 1 hour and 72 hours. Preferably, the above ranges relates to oven-drying, optionally with- or without-vacuum.

In an embodiment, the drying step occurs as soon as possible after the cocoa pulp has been isolated from other components on the cocoa pod.

In a preferred embodiment, the cocoa pulp and/or cocoa pulp extract is in the form of a powder, preferably a dried powder. In an embodiment, the powder has a particle size, d50 (preferably diameter where 50% of the mass of the particles in the sample have a diameter below that value), preferably in the range of 20 to 1000 microns, preferably 200 to 800 microns or 20 to 150 microns. For example, 100 to 1000 microns, 25 to 100 microns or 35 to 200 microns. Preferably, laser diffraction is used to measure the particle size, d50 using a Malvern Mastersizer 2000, Method Scirocco 2000 dry attachment, Fraunhofer scattering theory.

Alternatively, the particle size is measured by mesh, e.g. has a particle size less than 18 mesh (1000 microns), less than 20 mesh (841 microns), less than 40 mesh (420 microns), less than 100 mesh (149 microns) and less than 140 mesh (105 microns) and preferably greater than 625 mesh (20 microns), greater than 550 mesh (25 microns), 140 mesh (105 microns) or greater than 70 mesh (210 microns).

The powder may be obtained from the dried cocoa pulp or dried cocoa pulp extract using standard refining methods, e.g. milling, ball milling, jet milling, 2-, 3- or 5-roll refiners. In an embodiment, the powder may undergo further refining in the production process for a chocolate product, e.g. during the conching process for preparing chocolate.

Whilst it is preferable to process the cocoa pulp when fresh, in an embodiment, once depulped the cocoa pulp may be frozen to ensure freshness prior to subsequent treatment. This freezing may be carried out by standard equipment for freezing vegetable and fruit matter known in the art. If freezing is used at any point in the process of the present invention, the cocoa pulp or cocoa pulp extract is preferably subsequently defrosted prior to incorporation into the product of the invention.

In an embodiment, the cocoa pulp or cocoa pulp extract is treated to reduce the polysaccharide content to obtain a composition of the present invention.

The term polysaccharide relates to the dictionary definition of such polymers, i.e. a carbohydrate that consists of a number of molecules bonded together, preferably polysaccharides have greater than 8 saccharide units, greater than 10 units, or greater than 20 units and optionally less than 1000 units or less than 750 units.

The term encompasses both hetero- and homo-polysaccharides, linear and non-linear, for example.

In a preferred embodiment, the reduction in polysaccharide content means a degradation of the original polysaccharides, e.g. degradation of pectin, cellulose etc., into smaller polysaccharides, oligomers, and/or di/mono-saccharides. This degradation leads to a change in the molecular weight distribution of the polysaccharides, i.e. the molecular weight of the polysaccharides is lowered owing to the cleaving of the larger polysaccharides into smaller compounds.

Without being bound by theory, the reduction in polysaccharide content, preferably pectin and/or cellulose, leads to a reduction in any gelling and/or "jamming" effects caused when eating the products of the present invention.

In an embodiment, the cocoa pulp or cocoa pulp extract is treated to modify the viscosity, preferably to lower the viscosity.

In an embodiment, the viscosity is reduced by greater than 20%, preferably greater than 40%, more preferably greater than 60%, more preferably greater than 80% and more preferably greater than 90% relative to the viscosity of the untreated sample. In an embodiment, the viscosity is reduced by less than 98%, less than 95%, less than 75% or less than 70%. In an embodiment of the invention the viscosity is reduced by between 20% and 98%, i.e. the viscosity of the treated sample is reduced compared to that of the untreated sample with a higher percentage relating to a greater reduction. A method of measuring of the viscosity is given in the examples. As this is a relative value, the method used is not particularly important. However, preferably, the viscosity is dynamic viscosity measured in centipoises. A preferred specific method for measuring viscosity is present in the examples using a Rapid Viscosity Analyzer.

The treatment with an enzyme may lead to improved mouthfeel in chocolate product products, preferably chocolate, containing the composition of the present invention.

In an embodiment, the cocoa pulp or cocoa pulp extract is hydrolysed to reduce the polysaccharide content.

In an embodiment, the treatment of the cocoa pulp or cocoa pulp extract may increase the mono- and/or di- and/or oligo-saccharide content.

In an embodiment, the cocoa pulp extract production process comprises the treatment of the cocoa pulp or cocoa pulp extract with an enzyme. In an embodiment, the treatment with an enzyme lowers the viscosity of the cocoa pulp or cocoa pulp extract. This aspect of the invention provides advantages in respect of processing of the composition into products, and/or removes any potential unwanted organoleptic properties from using an overly viscous raw material.

In an embodiment, the treatment to reduce the polysaccharide content and/or to modify the viscosity may be done mechanically or physically, for example by centrifugation, preferably in a decanting centrifuge. This treatment may be used to remove polysaccharides present in the pulp.

In an embodiment, the temperature for enzyme treatment is between 200 C and 750 C, for example between 300 C and 650 C, between 550 C and 750 C or between 300 C and 550 C.

In an embodiment, the amount of enzyme used is between 10 mg/L and 250 mg/L of the cocoa pulp or cocoa pulp extract, preferably between 25 mg/L and 200 mg/L, preferably between 50 mg/L and 150 mg/L.

In an embodiment, the amount of enzyme used is between 1.0 g/L and 200 g/L of the cocoa pulp or cocoa pulp extract, preferably between 2.0 g/L and 100 g/L, preferably between 5.0 g/L and 50 g/L.

In an embodiment, the amount of enzyme used is between 0.05 ml/kg and 200 ml/kg of the cocoa pulp or cocoa pulp extract, between 0.1 ml/kg and 200 ml/kg, between 1.0 ml/kg and 200 ml/kg, preferably between 2.0 ml/kg and 100 ml/kg, preferably between 5.0 ml/kg and 50 ml/kg and more preferably 5.0 ml/kg and 20 ml/kg or 0.1 ml/kg and 10 ml/kg.

In an embodiment, the amount of enzyme used is between 0.10% and 20% of the weight of the cocoa pulp or cocoa pulp extract, preferably between 0.20% and 10%, more preferably between 0.5% and 5.0%.

The above-amounts relate to all enzymes present, i.e. the total amount of enzyme used relative to the cocoa pulp or cocoa pulp extract.

In an embodiment, the above ratios are based on a solids content of the cocoa pulp or cocoa pulp extract of between 10% and 75%, preferably for cocoa pulp of between 10% and 20% total solids content.

In an embodiment, the treatment process with an enzyme is carried out for between 10 minutes and 20 hours, between 10 minutes and 10 hours, 10 minutes and 8 hours, between 10 minutes and 6 hours, between 15 minutes and 4 hours, between 15 minutes and 2 hours or between 30 minutes and 2 hours.

In an embodiment, the treated cocoa pulp or cocoa pulp extract is stored and the suspended particles settle, preferably this is at a temperature between 2.00 C and 10.00 C and preferably for a time period of between 12 hours and 72 hours (for example, at between 3.00 C and 5.00 C for between 24 hours and 60 hours). In an embodiment, the treated cocoa pulp or cocoa pulp extract is subsequently filtered using known filtration techniques in the field of fruit pulp processing to provide a purified product.

In an embodiment, the cocoa pulp or cocoa pulp extract is treated to remove or degrade pectin and/or cellulose, preferably by treatment with an enzyme.

In an embodiment, the cocoa pulp or cocoa pulp extract is treated with a pectinase, for example EC 4.2.2.10 (CAS 9033-35-6), EC 3.2.1.15 (CAS 9032-75-1), EC 3.1.1.11 (CAS 9025-98-3), EC 4.2.2.9 or EC 4.2.2.2 (CAS 9015-75-2) and mixtures thereof.

In a further embodiment, enzymes other than pectinase may be used, or mixtures of enzymes may be used. In an embodiment, the enzymes used may be selected from the group comprising lignin-modifying enzymes and carbohydrases (for example, arabanase/arabinanase, cellulase, beta-glucanase, hemicellulase and xylanase) and mixtures thereof.

In an embodiment, the cocoa pulp or cocoa pulp extract is treated with a cellulase, for example EC 3.2.1.4, EC 3.2.1.91 or EC 3.2.1.21, or EC 3.2.1.99 and mixtures thereof.

Pectinases are classified in respect of: 1) pectin, pectic acid or oligo-D-galacturonate is the substrate; 2) is the cleavage random (endo-, liquefying or depolymerising enzymes) or endwise (exo- or saccharifying enzymes) and 3) whether they act by hydrolysis or trans elimination. In a preferred embodiment, the enzyme used is selected from the group consisting of pectin esterases, polymethylgalacturonases (exo- or endo), polygalacturonases (exo- or endo), polymethylgalacturonate lyases (exo- or endo), polygalacturonate lyases (exo- or endo) and protopectinases (e.g. endo-1.5-alpha-L-arabinanase) and mixtures thereof.

In an embodiment, an enzyme is added to the cocoa pulp or cocoa pulp extract either prior to or subsequent to any drying step and/or concentration step. In an embodiment, the addition of the enzyme is subsequent to a process step where any innate enzymes in the cocoa pulp have been inactivated.

In an embodiment, the enzyme selection and reaction conditions may be optimised for the substrate to be treated. For example, it is well known that certain pectinases operate at their optimum at acidic pH and others at an alkaline pH (for example, see Table 2, Pectinases: Enzymes for fruit processing industry, International Food Research Journal 21(2): 447-453 (2014), which is incorporated by reference).

In an embodiment, the amount of pectinase used is between 10 mg/L and 250 mg/L of the cocoa pulp or cocoa pulp extract, preferably between 25 mg/L and 200 mg/L, preferably between 50 mg/L and 150 mg/L.

In an embodiment, the amount of pectinase used is between 1.0 g/L and 200 g/L of the cocoa pulp or cocoa pulp extract, preferably between 2.0 g/L and 100 g/L, preferably between 5.0 g/L and 50 g/L.

In an embodiment, the amount of pectinase used is between 0.05 ml/kg and 200 ml/kg of the cocoa pulp or cocoa pulp extract, between 0.1 ml/kg and 200 ml/kg, between 1.0 ml/kg and 200 ml/kg, preferably between 2.0 ml/kg and 100 ml/kg, preferably between 5.0 ml/kg and 50 ml/kg and more preferably between 5.0 ml/kg and 20 ml/kg or 0.1 ml/kg and 10 ml/kg.

In an embodiment, the amount of pectinase used is between 0.10% and 20% of the weight of the cocoa pulp or cocoa pulp extract, preferably between 0.20% and 10%, more preferably between 0.5% and 5.0%.

The above-amounts relate to all pectinases present, i.e. if a mixture of enzymes is used, the total amount of pectinase used relative to the cocoa pulp or cocoa pulp extract.

In an embodiment, the pectinase has an activity of between 0.50 U and 1.50 U per gram of pulp, for example between 0.75 U and 1.25 U per gram of pulp.

Where appropriate, the enzymes may have an activity of between 1000 PGNU/ml and 30000 PGNU/ml, between 2000 PGNU/ml and 10000 PGNU/ml, for example between 3000 PGNU/ml and 8500 PGNU/ml.

Where appropriate, the enzymes may have an activity of between 50 PTF and 500 PTF, for example between 60 PTF and 400 PTF.

Where appropriate, the enzymes may have a polygalacturonase activity of between 2000 and 20000 micromol/min/g, for example between 3000 and 12000 micromol/min/g.

The activities of the various pectinases that may be used in the present invention are defined by the recited known standards. Polygalacturonase unit (PGNU) is defined as the amount of enzyme which will produce 1 mg of galacturonic acid sodium salt under standard conditions (acetate buffer, pH 4.5, 400C, 10 minute reaction time, 540 nm) and is given per ml of substrate or the amount of enzyme required to release one micromol of galacturonic acid from polygalacturonic acid per minute in acetate buffer, pH 4.5, 400C and is given per ml or g of enzyme (preferably the latter method is used). Correspondingly, pectinesterase unit (PEU) activity is that amount of enzyme which consumes 1 micro equivalent of sodium hydroxide per minute under standard conditions (30° C., pH 4.5). Pectin lyase unit (PLU) is the quantity of enzyme that catalyses the split of bound endo alpha-1-4 galacturonosidyl (C6 Methyl ester) forming one micromole of delta-4,5 unsaturated product in one minute, according to the above conditions but at 450 C and pH 5.5. PTF unit activity corresponds an enzyme activity, which leads to an increase of the extraction of 0.01 after 1 minute, at pH 5.8 and 300 C at 235 nm in a 0.5% pectin solution.

In an embodiment of the invention, the enzyme used in a treatment process of the present invention is selected from the group consisting of Ultrazym® AFP-L (for example, from Novo Nordisk Ferment Ltd), Rohament® PL, Rohapect® TPL or PTF (AB Enzymes), Novozyme® 33095, Pectinex® Ultra AFP, UF, Ultra Colour or Ultra Clear (Novozymes A/S), Neopectinase PL 1® (Novozymes A/S), pectin lyase 1A (nzytech), Depol 793 (Biocatalyst), Rapidase® Fibre (DSM) and mixtures thereof, for example.

In an embodiment, the cocoa pulp or cocoa pulp extract may be treated with other enzymes than pectinases or a mixture of a pectinase with another enzyme. The other enzymes may have activity against other polysaccharides (for example on glucans, cellulose, hemicellulose, arabinans, and/or beta-1,4-xylan) present in the cocoa pulp.

In an embodiment, the amount of cellulase used is between 0.05 ml/kg and 200 ml/kg of the cocoa pulp or cocoa pulp extract, between 0.10 ml/kg and 150 ml/kg, preferably between 0.1.0 ml/kg and 100 ml/kg, preferably between 5.0 ml/kg and 50 ml/kg and more preferably between 5.0 ml/kg and 20 ml/kg or between 0.1 ml/kg to 10 ml/kg.

In an embodiment, the amount of enzyme used is between 0.10% and 20% of the weight of the cocoa pulp or cocoa pulp extract, preferably between 0.20% and 10%, more preferably between 0.5% and 5.0%.

The above-amounts relate to all cellulases present, i.e. if a mixture of enzymes is used, the total amount of cellulase used relative to the cocoa pulp or cocoa pulp extract.

In an embodiment, the above ratios are based on a solids content of the cocoa pulp or cocoa pulp extract of between 10% and 75%, preferably for cocoa pulp of between 10% and 20% total solids content.

The activity of the various cellulases that may be used in the present invention are defined by the recited known standards. One cellulase unit (U) is defined as the amount of enzyme that causes the release of 1.25 micromole of glucose equivalents per minute at pH 4.6 and 400 C. One cellulolytic unit (ACU) is determined based upon the reduction of viscosity of a guar gum solution. In a preferred embodiment, the activity is between 400 and 3000 micromol/min/g, for example between 500 and 2500 micromol/min/g.

In an embodiment of the invention, the enzyme used in a treatment process of the present invention is selected from the group consisting of Cellulase 13L (Biocatalysts), Cellulase CE-3, Cellulase FG cone. (Enzyme Development Corporation), Cellulosin GMY and mixtures thereof, for example.

In an embodiment, the enzyme treatment may be carried out using at least two carbohydrases, optionally at least three carbohydrases, optionally at least four carbohydrases and optionally less than 20 carbohydrases or less than 10 carbohydrases.

In an embodiment, a mixture of enzymes is used with an activity of greater than 60 FBGU, optionally greater than 75 FBGU. Optionally, the activity is less than 180 FBGU, optionally less than 150 FBGU, and optionally less than 125 FBGU. For example, between 60 FBGU and 180 FBGU. One Fungal Beta-Glucanase Unit (FBGU) is the enzyme quantity which hydrolyzes fungal beta-glucan to reducing sugars corresponding to 1 μmol glucose per minute at pH 5.0 at 30° C.

In an embodiment, the cocoa pulp or cocoa pulp extract is treated with the mixture of enzymes between 1 hour and 7 hours, preferably between 2 hours and 5 hours.

In an embodiment, the cocoa pulp or cocoa pulp extract is treated with Viscozyme L (Novozymes A/S), which is a multi-enzyme complex containing a wide range of carbohydrases including arabanase, cellulase, beta-glucanase, hemicellulase, and xylanase.

In an embodiment, the enzymes used in the treatment may be deactivated, preferably prior to any drying of the cocoa pulp and/or cocoa pulp extract. Any suitable process may be used for this deactivation, for example, treatment at 80-110° C. for a time period of preferably between 2 minutes and 10 minutes, for example 5 minutes.

In an embodiment, the cocoa pulp or cocoa pulp extract is treated to increase the pH, for example the cocoa pulp is treated with an alkaline salt or base. The nature of the compound is not particularly limited, but is preferably a food-grade compound. In a preferred embodiment, the cocoa pulp is treated with compound such as mono-/di-/tri-sodium-/potassium-/calcium-phosphates, mono-/di-ammonium phosphate, sodium hydroxide, calcium hydroxide, potassium hydroxide, sodium carbonate, calcium carbonate, or potassium carbonate and mixtures thereof in order to increase the pH.

In an embodiment, the alkaline salt or base is combined with the cocoa pulp or cocoa pulp extract at an amount of greater than 0.10 wt % of the cocoa pulp or cocoa pulp extract, preferably greater than 0.15 wt % and preferably greater than 0.20 wt %. In an embodiment, the alkaline salt or base is combined with the cocoa pulp or cocoa pulp extract at an amount of less than 1.25 wt % of the cocoa pulp or cocoa pulp extract, preferably less than 1.0 wt % and preferably less than 0.90 wt %, for example between 0.10 wt % and 1.25 wt %, between 0.20 wt % and 0.90 wt % or between 0.25 wt % and 0.85 wt %.

In an embodiment, as mentioned above, the pH of the cocoa pulp is increased to be higher than the range of 2.75-4.0, optionally greater than 3.3-4.0 or 3.0-3.7 (all measured at 20° C.), for example, the pH is increased to be greater than 4.5, greater than 5.0, greater than 5.5 or greater than 6.0. For example, the pH is increased but is not increased to be greater than 8.0, not greater than 7.5 or not greater than 7.0 or not greater than 6.5 or not greater than 6.0.

In a preferred embodiment, the agent to increase the pH is added as an aqueous solution or slurry to the pulp. In a preferred embodiment, the concentration of the agent in water is between 5 g/100 ml and 50 g/100 ml, preferably between 10 g/100 ml and 30 g/100 ml. Preferably by adding the agent as an aqueous solution or slurry, undesired gelling does not occur which may increase viscosity of the pulp when higher concentrations of agent are added.

In an embodiment, the enzymatic treatment is carried out after the treatment to increase the pH. In an alternative embodiment, the enzymatic treatment is carried out before the pH treatment.

In an embodiment, the enzymatic treatment is carried out when the pH of the pulp is between 3.3 and 6.0, preferably between 4.25 and 5.0.

In an alternative embodiment, the pH treatment is carried out using dialysis (ion exchange). For example, using the processes disclosed in EP0049497 (Nestle SA).

In an embodiment, the process comprises treatment of the cocoa pulp in order to maximise the sugar content of the extract. In an embodiment, this treatment is to increase the amount of monomeric saccharides at the expense of dimeric, trimeric, oligomeric and/or polymeric saccharides or increase the trimeric and/or oligomeric content at the expense of polymeric saccharides. In an embodiment, this treatment may be enzymatic.

An embodiment of the present invention comprises the following steps: depulping of cocoa pods, pasteurisation of the pulp (e.g. thermal treatment), optionally enzymatic treatment and/or optionally alkalinisation treatment and drying (preferably by freeze-drying, vacuum drying or spray-drying). In a preferred embodiment, provided is a process comprising: depulping of cocoa pods, pasteurisation of the pulp (e.g. thermal treatment), enzymatic treatment and/or alkalinisation treatment and drying (preferably by freeze-drying, vacuum drying or spray-drying). The pasteurisation step may be any appropriate point in the process, e.g. may also be after enzyme treatment.

An embodiment of the present invention comprises the following steps: depulping, optional freezing, optional defrosting, enzymatic treatment, optional pasteurisation, alkalinisation and drying.

An embodiment of the present invention comprises the following steps: depulping, freezing, defrosting, enzymatic treatment, pasteurisation, alkalinisation and drying.

An embodiment of the present invention comprises the following steps: depulping, optional freezing, optional defrosting, alkalinisation, enzymatic treatment, pasteurisation and drying.

An embodiment of the present invention comprises the following steps: depulping, freezing, defrosting, alkalinisation, enzymatic treatment, pasteurisation and drying.

In the above embodiments, the alkalinisation step relates to pH adjustment and may occur before or after the enzymatic treatment, preferably after.

The present invention provides advantageous properties in respect of a reduction, or entire removal, of added sugar, with the sweetness being provided from a natural source, that also contains other components of the cocoa pod that contribute to the flavour of the chocolate.

In respect of added sugar, in an embodiment, the term "added sugar" refers to refined sugar, which encompasses processed sugars, e.g. white or brown sugars, which have their standard nutritional definitions. Preferably, as recited in Regulation (EC) No 1924/2006, the present invention relates to chocolate products where sugars have not been added and the product does not contain any added mono- or disaccharides or any other food used for its sweetening properties other than sugars that are inherently naturally present in the ingredients.

Accordingly, the present invention provides an alternative for added sugars by providing naturally occurring sugars that are present in the source of cocoa mass, cocoa butter and/or cocoa powder. Thus, the present invention provides a non-added sugar chocolate product containing natural sugar.

As mentioned above, the present invention offers advantageous properties in respect of heat stability.

In a preferred embodiment, these properties are provided without the need for additional gelling agents, emulsifiers and/or humectants typically used to provide improved heat stability, preferably the chocolate product of the present invention is substantially free of such additives, preferably does not contain such additives. In a preferred embodiment, the chocolate products of the present invention are substantially free from, preferably do not contain, humectants, preferably food grade humectants liquids. Exemplary humectants include propylene glycol, polyethylene glycol, polyols such as glycerol and sugar alcohols such as sorbitol, xylitol, maltitol, mannitol, or any mixture thereof. According to a particular exclusion the humectant liquid is a polyol. According to some exclusions the humectant liquid is glycerol. According to another exclusion the humectants liquid is propylene glycol. However other polyols are envisaged such as sugar alcohols.

The tropicalized chocolate and chocolate analogues of the invention can advantageously be used in tropical countries where hot weather causes frequent or rapid melting of chocolate, chocolate analogues. For example, chocolate analogues including coatings and covertures, which are thin and tend to melt rapidly, can surprisingly and advantageously be formed with the tropicalizing agent of the invention. The tropicalized food products of the invention remain non-sticky so as to smoothly slide out of a wrapper and to avoid leaving food product on the consumer's fingers during consumption.

In a preferred embodiment, the heat stability properties are evidenced by a heat shock and mechanical shock test as shown in the examples of the present invention. For instance, as shown by the SRI (shape retention index=$(l1 \times w1)/(l2 \times w2)$ where l1 and w1 are the length and width of the bar before heating, and l2 and w2 are the length and width dimensions of the minimal rectangle area that fully contains the sample after heat and mechanical shock test).

Within the scope of the present invention, an SRI of greater than 0.65, preferably greater than 0.70 and preferably greater than 0.75 shows desirability heat stability properties. The SRI cannot exceed 1, i.e. l1 and w1 are never larger than l2 and w2.

Furthermore, the present invention displays improved heat stability properties by virtue of delaying bloom development. Chocolate bloom is either of two types of whitish coating that can appear on the surface of chocolate: fat bloom, caused by changes in the fat crystals in the chocolate; and sugar bloom, due to crystals formed by the action of moisture on the sugar. Fat and sugar bloom damage the appearance of chocolate and limit its shelf life. Chocolate that has "bloomed" is still safe to eat (as it is a non-perishable food due to its sugar content), but may have an unappetizing appearance and surface texture.

In a preferred embodiment, it was found that by increasing the pulp or extract of pulp content, the onset of bloom could be further delayed. Accordingly, in a preferred embodiment, the chocolate product, preferably chocolate, comprises between 15% and 65% by weight of the chocolate product, preferably chocolate, of pulp (preferably dried) or pulp extract (preferably dried), preferably between 20% and 60%, more preferably between 22.5% and 50%, more preferably between 25% and 45%, for example between 25% and 40% or 30% and 40%.

Without wishing to be bound by theory, it is considered that the treatment of the present invention provides a saccharide distribution that offers advantages over the use of untreated pulps and extracts of pulps, which affords the heat stability and bloom properties, and also offer advantages over the untreated pulps in manufacture and organoleptic properties, preferably mouthfeel over the untreated pulps.

Chocolate Product

General Products of the Invention

The present invention provides new chocolate products comprising the materials of the present invention. In an embodiment, compositions of the invention may usefully be chocolate products (as defined herein), more usefully be chocolate or a chocolate compound. Independent of any other legal definitions that may be used compositions of the invention that comprises a cocoa solids content of from 25% to 35% by weight together with a milk ingredient (such as milk powder) may be informally referred to herein as 'milk chocolate' (which term also encompasses other analogous chocolate products, with similar amounts of cocoa-solids or replacements therefor). Independent of any other legal definitions that may be used compositions of the invention that comprises a cocoa solids content of more than 35% by weight (up to 100% (i.e. pure cocoa solids) may be informally referred to herein as 'dark chocolate' (which term also encompasses other analogous chocolate products, with similar amounts of cocoa-solids or replacements therefor).

The term 'chocolate' as used herein denotes any product (and/or component thereof if it would be a product) that meets a legal definition of chocolate in any jurisdiction and also include product (and/or component thereof) in which all or part of the cocoa butter (CB) is replaced by cocoa butter equivalents (CBE) and/or cocoa butter replacers (CBR).

The term 'chocolate compound' as used herein (unless the context clearly indicates otherwise) denote chocolate-like analogues characterized by presence of cocoa solids (which include cocoa liquor/mass, cocoa butter and cocoa powder) in any amount, notwithstanding that in some jurisdictions compound may be legally defined by the presence of a minimum amount of cocoa solids.

The term 'chocolate product' as used herein denote chocolate, compound and other related materials that comprise cocoa butter (CB), cocoa butter equivalents (CBE), cocoa butter replacers (CBR) and/or cocoa butter substitutes (CBS). Thus, chocolate product includes products that are based on chocolate and/or chocolate analogues, and thus for example may be based on dark, milk or white chocolate.

Unless the context clearly indicates, otherwise it will also be appreciated that in the present invention, any one chocolate product may be used to replace any other chocolate product and neither the term chocolate nor compound should be considered as limiting the scope of the invention to a specific type of chocolate product. Preferred chocolate product comprises chocolate and/or compound, more preferred chocolate product comprises chocolate, most preferred chocolate product comprises chocolate as legally defined in a major jurisdiction (such as Brazil, EU and/or US).

The term 'choco-coating' as used herein (also refers to a 'choco-shell') denotes coatings made from any chocolate product. The terms 'chocolate coating' and 'compound coating' may be defined similarly by analogy. Similarly the terms 'choco-composition, (or mass)', 'chocolate composition (or mass)' and 'compound composition (or mass)' denote compositions (or masses) that respectively comprise chocolate product, chocolate and compound as component(s) thereof in whole or part. Depending on their component parts the definitions of such compositions and/or masses may of course overlap.

The term 'chocolate product confectionery as used herein denotes any foodstuff which comprises chocolate product and optionally also other ingredients and thus may refer to foodstuffs such confections, wafers, cakes and/or biscuits whether the chocolate product comprises a choco-coating and/or the bulk of the product. Chocolate product confectionery may comprise chocolate product in any suitable form for example as inclusions, layers, nuggets, pieces and/or drops. The confectionery product may further contain any other suitable inclusions such as crispy inclusions for example cereals (e.g. expanded and/or toasted rice) and/or dried fruit pieces.

The chocolate product of the invention may be used to mould a tablet and/or bar, to coat confectionery items and/or to prepare more complex confectionery products. Optionally, prior to its use in the preparation of a chocolate product confectionery product, inclusions according to the desired recipe may be added to the chocolate product. As it will be apparent to a person skilled in the art, in some instances the product of the invention will have the same recipe and ingredients as the corresponding composition and/or mass while in other instances, particularly where inclusions are added or for more complex products, the final recipe of the product may differ from that of the composition and/or mass used to prepare it.

In one strongly preferred embodiment of the invention, the chocolate product confectionery product comprises a substantially solid moulded choco-tablet, choco-bar and/or baked product surrounded by substantial amounts of chocolate product. These products are prepared for example by substantially filling a mould with chocolate product and optionally adding inclusions and/or baked product therein to displace chocolate product from the mould (so-called wet shelling processes), if necessary further topping up the mould with chocolate product. For such strongly preferred products of the invention the chocolate product forms a substantial or whole part of the product and/or a thick outside layer surrounding the interior baked product (such as a wafer and/or biscuit laminate). Such solid products where a mould is substantially filled with chocolate are to be contrasted with products that comprise moulded thin chocolate shells which present different challenges. To prepare a thin-coated chocolate shell a mould is coated with a thin layer of chocolate, the mould being inverted to remove excess chocolate and/or stamped with a cold plunger to define the shell shape and largely empty the mould. The mould is thus coated with a thin layer of chocolate to which further ingredients and fillings may be added to form the interior body of the product.

Unless the context herein clearly indicates, otherwise it will also be well understood by a skilled person that the term chocolate product confectionery as used herein can readily be replaced by and is equivalent to the term chocolate confectionery as used throughout this application and in practice these two terms when used informally herein are interchangeable. However, where there is a difference in the meaning of these terms in the context given herein, then chocolate confectionery and/or compound confectionery are preferred embodiments of the chocolate product confectionery of the present invention, a preferred embodiment being chocolate confectionery.

Preferred chocolate product confectionery may comprise one or more —ingredients, for example selected from the group consisting of: chocolate product(s), compound product(s), chocolate coating(s) and/or compound coating(s). The products may comprise uncoated products such as choco-bar(s) and/or choco-tablet(s) with or without inclusions and/or products coated with chocolate product such as coated biscuits, cakes, wafers and/or other confectionery items. More preferably and/or alternatively any of the aforementioned may comprise one or more cocoa butter replacer(s) (CBR), cocoa-butter equivalent(s) (CBE), cocoa-butter substitute(s) (CBS) and/or any suitable mixture(s) thereof.

In chocolate product confectionery, the cocoa butter (CB) may be replaced by fats from other sources. Such products may generally comprise one or more fat(s) selected from the group consisting of: lauric fat(s) (e.g. cocoa butter substitute (CBS) obtained from the kernel of the fruit of palm trees); non-lauric vegetable fat(s) (e.g. those based on palm or other specialty fats); cocoa butter replacer(s) (CBR); cocoa butter equivalent(s) (CBE) and/or any suitable mixture(s) thereof. Some CBE, CBR and especially CBS may contain primarily saturated fats and very low levels of unsaturated omega three and omega six fatty acids (with health benefits). Thus in one embodiment in chocolate product confectionery of the invention such types of fat are less preferred than CB.

One embodiment of the invention provides a multi-layer product optionally comprising a plurality of layers of baked foodstuff (preferably selected from one or more wafer and/or biscuit layers, and/or one or more fillings layers there between with at least one coating layer located around these layers foodstuff, the coating comprising a chocolate product of or prepared according to the invention.

A further embodiment of the invention provides a chocolate product confectionery product, further coated with chocolate (or equivalents thereof, such as compound) for example a praline, chocolate shell product and/or chocolate coated wafer or biscuit any of which may or may not be layered. The chocolate coating can be applied or created by any suitable means, such as enrobing or moulding. The coating may comprise a chocolate product of or prepared according to the invention.

Another embodiment of the invention provides a chocolate product confectionery product of and/or used in the present invention, that comprises a filling surrounded by an outer layer for example a praline, chocolate shell product.

In another preferred embodiment of the invention the foodstuff comprises a multi-layer coated chocolate product comprising a plurality of layers of wafer, chocolate product, biscuit and/or baked foodstuff, with filling sandwiched between them, with at least one layer or coating being a chocolate product (e.g. chocolate) of the invention. Most preferably the multi-layer product comprises a chocolate product confectionery product (e.g. as described herein) selected from sandwich biscuit(s), cookie(s), wafer(s), muffin(s), extruded snack(s) and/or praline(s). An example of such a product is a multilayer laminate of baked wafer and/or biscuit layers sandwiched with filling(s) and coated with chocolate.

Baked foodstuffs used in the invention may be sweet or savoury. Preferred baked foodstuffs may comprise baked grain foodstuffs which term includes foodstuffs that comprise cereals and/or pulses. Baked cereal foodstuffs are more preferred, most preferably baked wheat foodstuffs such as wafer(s) and/or biscuit(s). Wafers may be flat or shaped (for example into a cone or basket for ice-cream) and biscuits may have many different shapes, though preferred wafer(s) and/or biscuit(s) are flat so they can be usefully be laminated together with a confectionery filling of the invention (and optionally a fruit based filling). More preferred wafers are non-savoury wafers, for example having a sweet or plain flavour.

A non-limiting list of those possible baked foodstuffs that may comprise chocolate compositions that comprise chocolate product of and/or used in the present invention are selected from: high fat biscuits, cakes, breads, pastries and/or pies; such as from the group consisting of: ANZAC biscuit, biscotti, flapjack, kurabiye, lebkuchen, leckerli, macroon, bourbon biscuit, butter cookie, digestive biscuit, custard cream, extruded snacks, florentine, garibaldi gingerbread, koulourakia, kourabiedes, Linzer torte, muffin, oreo, Nice biscuit, peanut butter cookie, polvor6n, pizzelle, pretzel, croissant, shortbread, cookie, fruit pie (e.g. apple pie, cherry pie), lemon drizzle cake, banana bread, carrot cake, pecan pie, apple strudel, baklava, berliner, bichon au citron and/or similar products.

Preferably the chocolate product of or prepared according to the invention may be suitable for use as (in whole or in part as a component) of one or more coatings and/or fillings.

The coating and/or filling may comprise a plurality of phases for example one or more solid and/or fluid phases such as fat and/or water liquid phases and/or gaseous phases such as emulsions, dispersions, creams and/or foams.

Therefore, broadly a further aspect of the invention comprises a chocolate product as described herein.

A yet further aspect of the invention broadly comprises use of a chocolate product of or prepared according to the invention as a chocolate product confectionery product and/or as a filling and/or coating for a foodstuff of the invention as described herein.

Specific Products of the Invention

In an embodiment of the present invention, the presence of the cocoa pulp and/or the extract of cocoa pulp affords a chocolate product that is distinguished over previously known chocolate products.

In a preferred embodiment, the present invention provides a composition that comprises pentanol-acetate, preferably 2-pentanol acetate, preferably the present invention provides a chocolate product that comprises pentanol-acetate, preferably 2-pentanol acetate, and most preferably a chocolate product that comprises pentanol-acetate, preferably 2-pentanol acetate.

In a preferred embodiment, the present invention provides a composition that comprises heptanol-acetate, preferably 2-heptanol acetate, preferably the present invention provides a chocolate product that comprises heptanol-acetate, preferably 2-heptanol acetate, and most preferably a chocolate product that comprises heptanol-acetate, preferably 2-heptanol acetate.

In a preferred embodiment, the combined amount of pentanol-acetate and heptanol-acetate to the amount of furfural present in the chocolate product, preferably chocolate, is present in a ratio of greater than 0.75:1.0, preferably greater than 1.50:1.0, for example preferably greater than 2.00:1.0, greater than 3.00:1.0, greater than 5.00:1.0 or greater than 6.50:1.0. In a preferred embodiment, the combined amount of pentanol-acetate and heptanol-acetate to the amount of linalool present in the chocolate product, preferably chocolate, is present in a ratio of less than 10.0:1.0 or less than 9.0:1.0, for example, between 0.75:1.0 and 10.0:1.0.

In a preferred embodiment, the combined amount of pentanol-acetate and heptanol-acetate to the amount of linalool present in the chocolate product, preferably chocolate, is present in a ratio of greater than 1.20:1.0, preferably greater than 1.40:1.0, for example preferably greater than 2.00:1.0, greater than 3.00:1.0, greater than 5.00:1.0 or greater than 6.50:1.0. In a preferred embodiment, the combined amount of pentanol-acetate and heptanol-acetate to the amount of linalool present in the chocolate product, preferably chocolate, is present in a ratio of less than 12.0:1.0 or less than 10.0:1.0, for example, between 1.20:1.0 and 12.0:1.0.

The above results are preferably obtained using GC-MS (Gas chromatography mass spectrometry), preferably the GC-MS protocol set out in the examples of this specification. The above results may be obtained from peak areas of the respective peaks when measured according to the standard mentioned in the examples.

In a preferred embodiment, the amount of pentanol-acetate is present in the chocolate product, preferably chocolate, in an amount such that the peak area ratio relative to the standard defined below is greater than 0.05:1.0, preferably greater than 0.10:1.0, preferably greater than 0.20:1.0, for example greater than 0.25:1.0, greater than 0.50:1.0 or greater than 1.0:1.0.

In a preferred embodiment, the amount of pentanol-acetate is present in the chocolate product, preferably chocolate, in an amount such that the peak area ratio relative to the standard defined below is less than 2.00:1.0, preferably less than 1.75:1.0, preferably less than 1.50:1.0, for example less than 0.75:1.0, less than 0.30:1.0 or less than 0.25:1.0. A preferred embodiment of the above, has a peak area ratio of from 0.05:1.0 to 2.00:1.0.

In a preferred embodiment, the amount of heptanol-acetate is present in the chocolate product, preferably chocolate, in an amount such that the peak area ratio relative to the standard defined below is greater than 0.03:1.0, preferably greater than 0.05:1.0, preferably greater than 0.10:1.0, for example greater than 0.15:1.0, greater than 0.20:1.0 or greater than 0.40:1.0.

In a preferred embodiment, the amount of pentanol-acetate is present in the chocolate product, preferably chocolate, in an amount such that the peak area ratio relative to the standard defined below is less than 1.00:1.0, preferably less than 0.85:1.0, preferably less than 0.75:1.0, for example less than 0.65:1.0, less than 0.60:1.0 or less than 0.50:1.0. A preferred embodiment of the above, has a peak area ratio of from 0.03:1.0 to 1.00:1.0.

In an embodiment of the present invention, the chocolate product, preferably chocolate, comprises between 5% and 65% by weight of the chocolate product, preferably chocolate, of cocoa pulp (preferably dried) or cocoa pulp extract (preferably dried), preferably between 10% and 65%, more preferably between 15% and 60%, more preferably between 20% and 60%, for example between 20% and 55%, 20% and 40%, 34% to 58% or 37% to 50%.

In an embodiment of the present invention provided is a composition that comprises cocoa pulp or a cocoa pulp extract and cocoa mass, preferably wherein a portion (preferably all) sugar in the composition is provided by the cocoa pulp or cocoa pulp extract.

In an embodiment of the present invention, the cocoa pulp or the extract of cocoa pulp, preferably in the form of a powder, is dispersed throughout the chocolate product. In a preferred embodiment, the cocoa pulp or the extract of cocoa pulp is or the extract of cocoa pulp is dispersed within a continuous fat phase of the chocolate product, preferably is dispersed with the cocoa butter phase. In a preferred embodiment, the cocoa pulp or the extract of cocoa pulp is a dried powder that is dispersed in a cocoa butter matrix in the chocolate product.

In an embodiment of the present invention, the cocoa pulp or the extract of cocoa pulp may be in the form of inclusions, preferably of size 0.5-15.0 mm, e.g. 1.0-10.0 mm. In an embodiment, this particle size may be measured with a ruler for 10 or more sample pieces, preferably 10, and averaged, with the longest diameter assessed by eye.

In a preferred embodiment, is the inclusions may be dispersed within a continuous fat phase of the chocolate product, preferably is dispersed with the cocoa butter phase.

Alternatively, the powder and/or inclusions may be present in a filling of a chocolate product.

In an embodiment of the present invention, the cocoa pulp or the extract of cocoa pulp is the main source of sugar in the chocolate product, preferably chocolate, preferably the cocoa sugar constitutes over 60% by weight of the sugar in the chocolate product, preferably chocolate, preferably over 75%, more preferably over 80%, more preferably over 85%, more preferably over 90%, more preferably over 95% and more preferably 100%.

In an embodiment of the present invention provided is a composition that comprises a cocoa pulp extract and cocoa mass, without added sugar.

In an embodiment, the chocolate product comprises between 0% and 95% by weight of the chocolate product of cocoa mass dependent on the end product, preferably between 0% and 85%, for example, between 45% and 80%, less than 5% or between 8% and 12% by weight of the chocolate product of cocoa mass.

In an embodiment, the chocolate product comprises between 0% and 35% by weight of the chocolate product of cocoa butter dependent on the end product, preferably between 0% and 30%, for example, between 6% and 15%, less than 5% or between 20% and 35% by weight of the chocolate product of cocoa butter. In an embodiment, the addition of cocoa butter is independent of any present in the cocoa mass.

In an embodiment of the present invention, the chocolate product is selected from the group consisting of milk chocolate, dark chocolate and white chocolate.

In the present invention, the cocoa mass consists essentially of cocoa solids and cocoa butter.

In an embodiment, the cocoa mass is cocoa liquor, preferably in solid or semi-solid at ambient temperature (e.g. 20° C.). In an embodiment, the cocoa liquor may be steam-treated. In an embodiment, the cocoa mass may be Arriba cocoa mass.

In an embodiment, the composition consists essentially of cocoa mass and cocoa pulp extract or consist essentially of cocoa mass and dried cocoa pulp.

In this invention, the term "consists essentially" of means at least 95.0 wt%, more preferably at least 97.5 wt %, more preferably at least 98.0 wt% and more preferably at least 99.0 wt%, preferably up to and including 100.0 wt%.

In an embodiment, the present invention provides a chocolate that consists of cocoa mass and cocoa pulp extract.

In an embodiment, the composition further comprises at least one component selected from the group consisting of a flavoring, milk-based component, an emulsifier, cocoa butter and an additional sugar, preferably at least one component selected from the group consisting of a milk-based component, an emulsifier, and cocoa butter.

In an embodiment, the composition further comprises at least one component selected from the group consisting of a milk-based component, an emulsifier and cocoa butter, preferably at least one component selected from the group consisting of a milk-based component, an emulsifier, and cocoa butter.

In an embodiment, if cocoa butter is used in addition to cocoa mass, the additional cocoa butter is used in an amount of less than 20% by weight of the chocolate product composition, preferably less than 15% by weight and preferably greater than 2.5% by weight, preferably greater than 5.0% by weight, for example between 2.5% and 20%.

In an embodiment of the present invention, the milk-based component is selected from the group consisting of non-fat milk solids, milk powder (optionally full cream, skimmed or semi-skimmed) and milk fat. In an embodiment, the milk products may be spray dried within the standard parameters for the production of these known products.

In an embodiment, the emulsifier is selected from the group consisting of lecithin, polyglycerol polyricinoleate and ammonium phosphatide. In an embodiment, the amount of emulsifier may be between 0.05 and 1.0% by weight of the composition, preferably between 0.1% and 0.5%. Alternatively, an emulsifier may not be present In an embodiment, the flavoring may be any that is typically used in chocolate manufacture, for example, vanilla-based/extract (e.g. vanillin) or hazelnut-based/extract (e.g. hazelnut paste or oil).

In an embodiment, the composition comprises inclusions. The inclusions may be any that are commonly used in the art, for example, fruit-based inclusions, nut-based inclusions, cereal-based inclusions and yogurt-based inclusions, for example. The inclusions may take the form of those commonly used, for example chips, flakes etc. The inclusions may be present in an amount of from 2.5% to 25% based on the weight of the chocolate product.

In an embodiment, the present invention relates to a white chocolate composition, for example a composition that comprises between 10% and 65% by weight of cocoa pulp (preferably dried) or cocoa pulp extract (preferably dried), and between 20% and 60% milk powder (optionally a mixture of whole and skimmed milk powder).

Specific, non-limiting chocolate recipes are now described. In all embodiments below, the percentages relate to wt % of the total chocolate product.

In an embodiment, the chocolate product composition comprises:
45-80% of cocoa mass
10-55% of the cocoa pulp extract of the present invention
0-5% of cocoa butter
0.0-0.5% of lecithin In an embodiment, the chocolate product composition comprises:
8-12% of cocoa mass
34-58% of the cocoa pulp extract of the present invention,
18-25% of cocoa butter
3.5-6.5% of milk fat
15-30% of milk powder
0.3-0.5 of lecithin In an embodiment, the chocolate product composition comprises:
37-50% of the cocoa pulp extract of the present invention,
18-24% non-fat milk solids
4-7% of milk fat
22-35% of (optionally deodorised) cocoa butter
20-40% of milk powder
0.2-0.5 of lecithin In an embodiment of the present invention, the chocolate products are prepared process that include the traditional fermentation and roasting processes of cocoa beans that are well known in the art.

In an embodiment, the *theobroma* genus pods are unfermented, under-fermented or fermented. In an embodiment, the above terms may be defined as follows. Fermentation is normally performed between 2 and 6 days, depending on the variety, origin and what flavour is to be delivered. Unfermented means no intentional fermentation occurs and under fermented is less than 2 days of fermentation.

In an alternative embodiment, the chocolate products of the invention are non-roasted. Non-roasted denotes the composition is produced by a non-roasting process in which the cocoa-solid components thereof (such as cocoa beans, nibs and the like) are not subject to a high temperature (140° C. or higher, or 120° C. or higher, for example) for a lengthy time (for example, 30 minutes or more). Without wishing to be bound by any mechanism it is believed that in a non-roasting process the conditions are either insufficiently high in temperature (preferably below 120° C., more preferably less than or equal to 110° C., even more preferably less than or equal to 100° C., most preferably less than or equal to 90° C., for example less than or equal to 80° C.) and/or of sufficiently short duration (preferably less than 30 minutes, more preferably less than 20 minutes, even more preferably less than 10 minutes, most preferably less than 5 minutes, for example less than 4 minutes) so undesired chemical reactions such as the Maillard reaction are not allowed to develop to any great extent and thus significant amounts of flavour active compounds are not generated which might otherwise impart strong roasted notes to the composition. A roasting process or step is to be distinguished from treatments such as flash heating where raw ingredients such as cocoa beans and/or nibs may be treated at high temperatures (typically 1200 to 1600 C) for a very short period (typically no more than 200 seconds) to deactivate any microbial contaminants to make the ingredient safe for human consumption. Such anti-microbial and/or de-bacterising treatments and/or steps are still considered within the scope of a non-roasting process.

The present invention thus provides a chocolate product from one source, i.e. cocoa pods.

Accordingly, the present invention provides a process for preparing a chocolate product where the ingredients of the chocolate product are combined with cocoa pulp, preferably dried, or cocoa pulp extract.

In a preferred embodiment, the present invention also provides a process for producing a chocolate product, comprising the steps of:

a. treating cocoa pulp or an extract of cocoa pulp to reduce the polysaccharide content and/or treating cocoa pulp or an extract of cocoa pulp to adjust the pH, b. drying the product of step a., and c. combining the product of step b. with at least one other ingredient present in the chocolate product.

In a preferred embodiment, the above process relates to the preparation of a chocolate product, preferably chocolate, and the at least one other ingredient is a cocoa mass.

In an embodiment of the present invention, provided is a process for producing a chocolate product where all ingredients are from a cocoa pod, i.e. the chocolate product consists essentially of ingredients derived from a cocoa pod.

In an embodiment of the present invention, in the production of a chocolate product the dried cocoa pulp or cocoa pulp extract is combined with the other ingredients at the point where added sugar is normally introduced.

In an embodiment of the present invention, provided is a process for preparing a chocolate product comprising the steps of combining a cocoa mass and a cocoa pulp or an extract of cocoa pulp. In an embodiment, the combining of the cocoa pulp or extract of cocoa pulp may be done by any device traditionally used to combine sugar with a cocoa mass as used in the traditional production of chocolate.

In an embodiment, the chocolate composition of the present invention may be refined using known equipment as applicable. In a preferred embodiment, the chocolate is refined to ensure a non-grainy texture. For example, the refining may be carried out to achieve a particle size (D90 measured by a Malvern Mastersizer 3000) of less than 50 microns, preferably between 15 microns and 35 microns.

In an embodiment, the traditional conching process is used to prepare the chocolate. In a preferred embodiment, the temperature in the conching step does not exceed 600 C, preferably does not exceed 57.50 C and preferably does not exceed 560 C. By controlling the temperature during this step, caramelisation of the pulp is avoided and the texture of the final product is not grainy. In a preferred embodiment, the temperature is greater than 300 C, preferably greater than 350 C or greater 400 C or greater than 450 C.

In an embodiment, the conching is carried out for a period of greater than 1.5 hours, preferably greater than or equal to 2 hours, preferably greater than or equal to 2.5 hours. In an embodiment, the conching is carried out for a period of less than 8 hours, preferably less than 6 hours.

In an embodiment, the conching is carried out for a period of between 1.5 hours and 8 hours at a temperature between 300 C and 600 C.

In an embodiment, the conching speed is between 200 rpm and 2000 rpm, preferably between 400 rpm and 1600 rpm.

In a preferred embodiment, the cocoa pulp and/or cocoa pulp extract is not caramelised, for example, the process steps used to produce the composition of the invention do not lead to caramelisation.

In an embodiment, the conching speed and/or temperature may vary over the conching step within the above ranges.

Unless defined otherwise, all technical and scientific terms used herein have and should be given the same meaning as commonly understood by one of ordinary skill in the art to which this invention belongs.

Unless the context clearly indicates otherwise, as used herein plural forms of the terms herein are to be construed as including the singular form and vice versa.

In all ranges defined above, the end points are included within the scope of the range as written. Additionally, the end points of the broadest ranges in an embodiment and the end points of the narrower ranges may be combined.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole. Preferably, where appropriate (for example in amounts of ingredient) such percentages are by weight.

Unless otherwise specified, the percentages listed are by weight.

The present invention is further described by reference to the non-limiting specific examples.

EXAMPLES

The following compositions within the scope of the invention were prepared:

TABLE 1

| Ingredient | Example 1 Dark chocolate 36 wt % of pulp | Example 2 Dark chocolate with 20 wt % pulp | Example 3 Dark chocolate 20 wt % pulp + strawberry pieces | Example 4 White chocolate with 25 wt % pulp |
|---|---|---|---|---|
| Cocoa butter | 10.90 | 6.00 | 5.82 | 32.92 |
| Whole milk powder | — | — | — | 31.93 |
| Skimmed milk powder | — | — | — | 9.98 |
| Cocoa liquor | 52.68 | 73.97 | 71.75 | — |
| Cocoa pulp powder | 36.42 | 20.03 | 19.43 | 24.94 |
| Natural vanilla | — | — | — | 0.03 |
| Lecithin | — | — | — | 0.20 |
| Strawberry pieces | — | — | 3.00 | — |
| TOTAL | 100.00 | 100.00 | 100.00 | 100.00 |

| Mixing/kg | Example 1 | Example 4 |
|---|---|---|
| Cocoa butter | | 1.67 |
| Whole milk powder | | 2.55 |
| Skimmed milk powder | | 0.80 |
| Cocoa liquor | 2.90 | |
| Cocoa pulp powder | 2.00 | 2.00 |
| Natural vanilla | | 0.0021 |

| Conching/kg | Example 1 | Example 4 |
|---|---|---|
| Cocoa butter | 0.60 | 0.96 |
| Refined Mass | 4.91 | 7.02 |
| Lecithin | | 0.02 |

Preparation of Cocoa Pulp Powder for Examples 1 to 4

Cocoa pods of varieties PH16, Salobrinho and CCN51 were washed in running water. They were then immersed in chlorinated water containing 200 mg/L of free chlorine for 10 minutes. They were then washed with chlorinated water containing 5 mg/L of free chlorine by spraying.

The fruits were broken manually with the help of stainless steel knives. Then, the pulp seeds were separated from the bark.

The pulping was performed on a commercially available fruit pulper using a brush system. The pulp was collected directly in 40×50 cm polypropylene plastic bags, which were sealed under vacuum. After packing, the pulps were frozen and stored in Cold Lab ultra-freezer at −800 C.

Lyophilization of the cocoa pulp was conducted on Lio Top equipment for 96 hours in two batches. In each batch, 8 trays were placed with 2.5-3.0 kg/tray.

After the lyophilization process was complete, the trays with dehydrated pulp were removed from the equipment. The lyophilized pulp was removed from the trays and placed in rolled bags, which were then vacuum sealed, providing freeze-dried cocoa pulp powder.

Preparation of Chocolate Compositions

Example 1

The cocoa pulp powder produced above was brought to room temperature and was mixed with cocoa liqueur using a standard kitchen food processor (a Crypto mill mixer).

A Buhler SOY 200 3-cylinder refiner was used to reduce the particle size to 23 microns (measured by hand using a micrometer). The cylinder spacing was controlled by setting the pressures on the refiner (gauge readings—right 0.7, 7; left 0.4, 6.4; right exit 0, 11.8 and left exit 0.8, 7.8).

The refined composition was then subjected to conching in an Elkolino ELK-0005-V device with the following parameters: Before starting the conching step, add 100 g cocoa butter into the conche, process at 45° C., time 10 minutes, 500 rotations/minute, and then change the temperature and rotation to 560 C, time 220 minutes, 1200 rotations/minute. Add 500 g cocoa butter and change the temperature to 450 C, 60 minutes, 1500 rotations/minute.

The chocolate was then tempered at 29.80 C by hand on a marble-topped table.

Example 2

This example was prepared according to the process set out for Example 1 but with the amount of cocoa pulp powder modified as shown by Table 1.

Example 3

This example was prepared according to the process set out for Example two but the refining step provided a particle size of 41 microns and strawberry pieces were added in the amount specified.

Example 4

A white chocolate was prepared in contrast to the above dark chocolates.

The milk powders, cocoa pulp powder, natural vanilla and a portion of the cocoa butter (64% of the total cocoa butter in the final product) were combined using a kitchen food processor. The composition was refined to provide a particle size of 32 microns. The remaining cocoa butter and refined mass were added to a laboratory Lipp conche and were processed for 2 hours at a temperature between 45-500 C to provide the final product.

The chocolate compositions were found to have a fruity, floral taste that distinguishes them from chocolate compositions that did not use cocoa pulp as a sugar-replacement.

Preparation of Cocoa Pulp Powder for Examples 5 to 6

Cocoa pods of varieties PH16, Salobrinho and CCN51 were washed in running water. They were then immersed in chlorinated water containing 200 mg/L of free chlorine for 10 minutes. They were then washed with chlorinated water containing 5 mg/L of free chlorine by spraying.

The fruits were broken manually with the help of stainless steel knives. Then, the pulp seeds were separated from the bark.

The pulping was performed on a commercially available fruit pulper using a brush system. The pulp was collected directly in 40×50 cm polypropylene plastic bags, which were sealed under vacuum. After packing, the pulps were frozen and stored at −18° C.

Example 5

Initially the pulps were thawed. Then, for the enzymatic treatment, batches of 3.0 kg of pulp were placed in a jacketed reactor and the temperature was raised to 42.5° C. with the aid of a thermostatic bath, when the temperature was reached, the enzyme (Pectinex® Ultra Clear, Novozymes) was added under the following conditions:

Concentration: 1 ml of enzyme/100 g of pulp
Temperature: 42.5° C.
Reaction time: 60 minutes
Rotation 100 rpm Shortly after the enzymatic treatment, heat treatment was performed at 90° C. for 5 minutes and cooling at 20° C. The cooled material was frozen for further lyophilisation treatment.

Example 6

At the end of the 60 minutes of enzymatic reaction described in Example 5, a sample was taken and enough calcium hydroxide was added to the pulp to adjust the pH to approximately 5.0. The following conditions were used:

12.9 g of Ca(OH)2 were added to each 3 kg of pulp (0.43%);

Mixing was carried out with the mixer at a speed of 200 rpm for about 15 minutes; and The pasteurization was then carried out at 90° C. for 5 minutes and cooled to 20° C.

The cooled material was frozen and taken to lyophilization.

Lyophilization of the cocoa pulp was conducted on Lio Top equipment for 96 hours in two batches. In each batch, 8 trays were placed with 2.5-3.0 kg/tray.

After the lyophilization process was complete, the trays with dehydrated pulp were removed from the equipment. The lyophilized pulp was removed from the trays and placed in rolled bags, which were then vacuum sealed, providing freeze-dried cocoa pulp powder.

Testing

Prior to lyophilisation, the pH of the natural pulp, the enzymatically treated pulp and the bi-treated pulp were found to be 3.52±0.32, 3.36±0.02 and 4.77±0.05 at 200 C, respectively, based on the mean of two sets of measurements.

Viscosity measurements were taken based on the mean of two sets of measurements using a Brookfields RVDV 111 rheometer at 30 0 C with rotation for 60 s.

Apparent viscosity (100 rpm) Apparent viscosity (250 rpm) for natural pulp, 611.5±2.12 and 322.5±3.53, pulp enzymatically treated 400.0±14.14 and 162.5±10.60 and pulp enzymatically treated with pH adjustment 392.5±12.43 and 158±11.32 (all results are reported in centipoise).

Accordingly, it can be seen that the treatment of the present invention provides a reduction in viscosity.

Example 7

The compositions prepared in Examples 5 and 6 were processed into chocolate compositions using the earlier defined process for Example 1, with the exception the pulp composition was included at 33% by weight of the final product, the cocoa mass at 53% and the cocoa butter at 14% and the conching temperature was 500 C.

Upon informal tasting by a small panel, the pre-treatment of the pulp provided a chocolate with quicker melting and lower residence time in the mouth properties, as compared to the non-pre-treated pulp.

Example 8

The PH16 and Salobrinho cocoa pulp samples from the above preparation sample were assessed using GC-MS with 500 mg samples. The protocol was as follows:

Preparation of Standard:

100 (±1) mg of methyl valerate was weighed into a 10 ml volumetric flask. The flasks were topped up to 10 ml with methanol to obtain the stock solutions of concentrations of 10 g/L. Until use, the solutions were stored in a freezer at approximately −300 C. To prepare the working solutions 50 μl of the stock solution was pipetted into a 100 ml volumetric flask containing approx. 30 ml water. Afterwards the flask was topped up to 100 ml with water and the mixture was homogenised. The working solution was added directly to the sample prior to analysis. The working solution was prepared freshly for different tests.

500 (±5) mg of powdered cocoa pulp was weighed precisely into a 20 ml headspace vial. Afterwards 4 ml of purified water and 50 μl of the working solution were added. The vial was sealed, the mixture was homogenized and the volatile components were extracted from the sample using solid phase micro extraction (SPME). The samples were analyzed in duplicate by means of gas chromatography mass spectrometry (GC-MS). SPME was carried out automatically using a CTC CombiPAl (CTC Analytics, Zwingen, Switzerland). The sample was incubated for 30 min at 60° C. and 300 rpm. Afterwards the volatiles were absorbed onto a divinylbenzene/carboxen/polydimethylsiloxane (DVB/CAR/PDMS) coated fiber (50/30 μm, stable flex/SS, 1 cm, Supelco, Bellefonte, USA) for 30 min at 60° C. and 300 rpm. The odorants were then desorbed into the GC-MS inlet for 10 min at 240° C., venting to split after 2 min. The fiber was re-used without any additional conditioning for the next extraction.

The samples were analyzed using an Agilent 6890 N gas chromatograph (Agilent, Stockport, UK) and an Agilent 5973 Network MSD (Agilent, Stockport, UK). Gas chromatographic separation was carried out on a BP-20 column (60 m×0.25 mm i.d.; film thickness 0.25 μm; SGE Analytical Science, Milton Keynes, UK). The sample was injected in splitless mode using an inlet temperature of 240° C. Helium was used as the carrier gas (flow=1.5 ml/min). The mass spectrometer was operated in scan mode from m/z 30 to 300 in electron impact (EI) mode using an electron energy of 70 eV. The GC-MS transfer line, ion source and quadrupole temperatures were 280° C., 230° C. and 150° C. respectively. The oven program started with an isothermal step at 40° C. for 5 min and was ramped to 240° C. at 5° C./min. The oven was then held at 240° C. for 10 min.

The GC-MS data files were converted into MassHunter compatible files using MassHunter GC/MS Translator® B.07.00 (Agilent, Waldbronn, Germany). These files were afterwards imported into MassHunter Unknown Analysis® B.06.00 (Agilent, Waldbronn, Germany). Deconvolution was performed using an asymmetric window of 0.3 amu to the left and 0.7 amu to the right. Identification was achieved by comparison of the spectra for the deconvoluted peak with the commercially available NIST Mass Spectral Library. Positive hits were revised manually. The peak areas of the target analytes were extracted using m/z values by means of MassHunter Quantitative Analysis® software B.06.00 (Agilent, Waldbronn, Germany). For each analyte the area ratio (peak area (analyte)/peak area (internal standard)) was calculated and averaged over the repetitions (4 repeats).

| compound | m/z | retention time [min] |
|---|---|---|
| methyl valerate (internal standard) | 74 | 11.93 |
| furfural | 23.27 | |
| 2-pentanol acetate | 87 | 11.62 |
| 2-heptanol acetate | 87 | 17.74 |
| linalool | 93 | 25.43 |

The results are displayed in FIG. 1.

Example 9

Cocoa mass blends at a weight ratio of 60/40 for 1. Sucrose, 2. Salobrinho and 3. PH 16 were prepared with a cocoa mass from the Ivory Coast.

Figure 2:
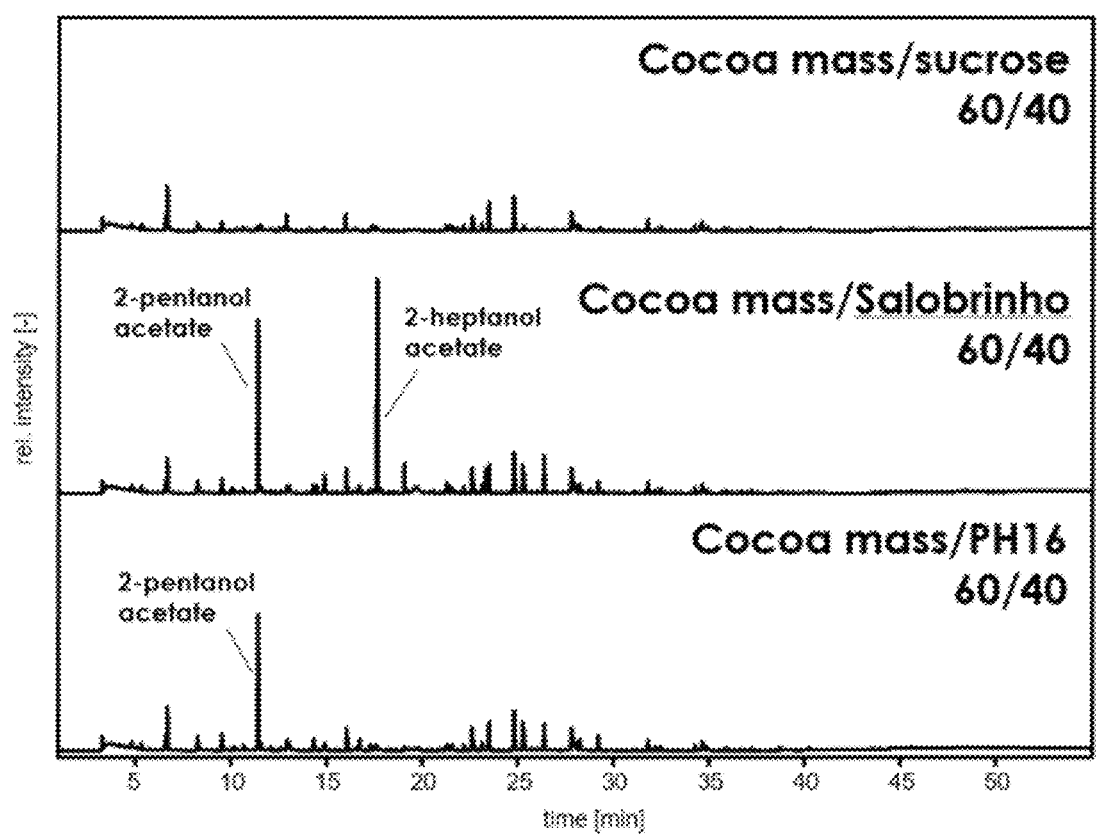

The results are displayed in FIG. 2.

Example 10a

Figure 3:
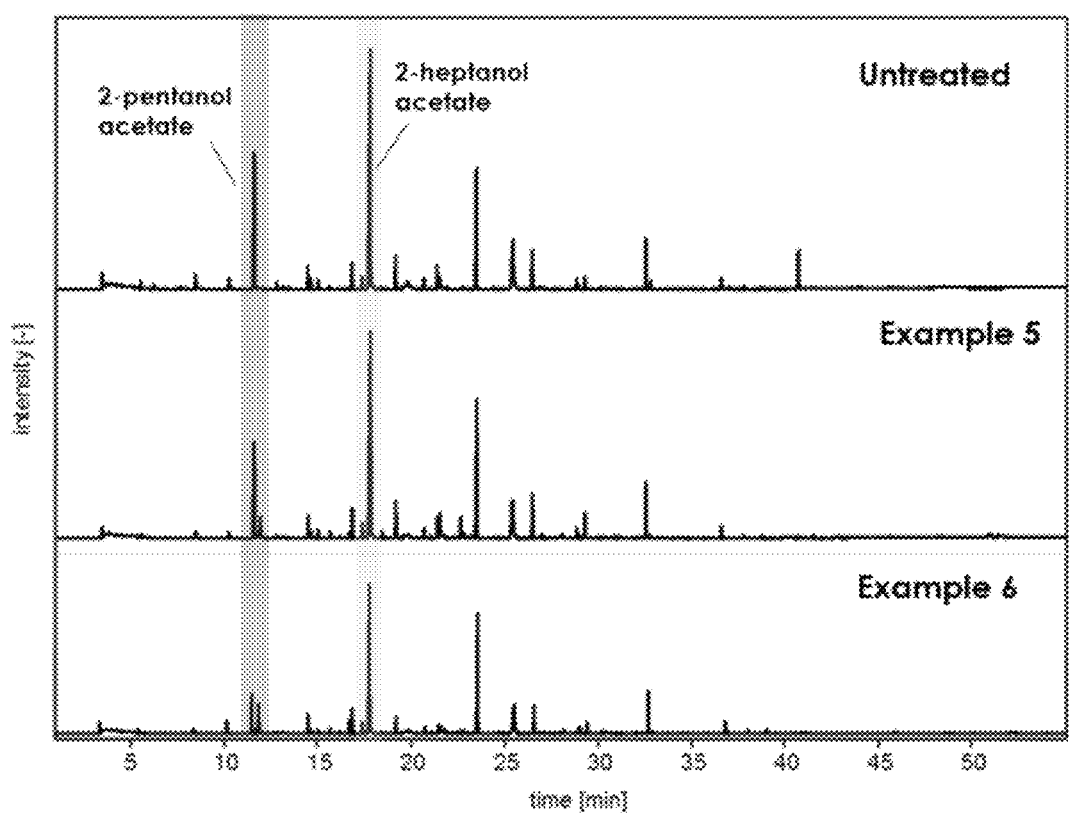

The cocoa pulp samples of Examples 5 and 6 were tested as above and the results are displayed in FIG. 3.

Example 10b

The compositions of Example 7 and a reference sample with 33% sucrose were analysed using the above procedures to obtain peak area ratios.

| | 2-pentanol acetate | 2-heptanol acetate | furfural | linalool |
|---|---|---|---|---|
| Reference Dark Chocolate, 33% sucrose | 0.03736 | 0.02803 | 0.10095 | 0.05617 |
| StDev | 0.00122 | 0.0005 | 0.00241 | 0.0017 |
| Dark Chocolate 33% Example 5 | 0.2536 | 0.56072 | 0.32442 | 0.10858 |
| StDev | 0.00238 | 0.02602 | 0.01496 | 0.00781 |
| Dark Chocolate 33% Example 6 | 0.28118 | 0.48668 | 0.13354 | 0.10877 |
| StDev | 0.00418 | 0.01844 | 0.00556 | 0.00371 |

Example 11

Cocoa pulp from a variety of cocoa plants was obtained and frozen at −20° C. and then defrosted before undergoing pH adjustment and/or enzymatic treatment. The initial pH of the pulp was 3.0.

pH adjustment:

1.4 g Ca(OH)2 to 500 g Pulp 4 pH 4
2.0 g Ca(OH)2 to 500 g Pulp 4 pH 4.5
3.0 g Ca(OH)2 to 500 g Pulp 4 pH 5

Enzymatic treatment:

500 g Pulp+(2.0 g) Ca(OH)2+5 ml Depol™ 4 pH 4.5, 2 h, 43° C.
500 g Pulp+(3.5 g) Ca(OH)2+5 ml Depol™ 4 pH>6, 2 h, 43° C.

The enzymes were inactivated by treatment for 1 hour at 100° C. in a stove and dried at 80° C. in stove, with 500 cm2 drying surface (a 25×20 cm tray).

| | | Mass/g, pre- and after drying 80° C. | | |
|---|---|---|---|---|
| Sample | Viscosity/cm | Pre | 1 hour | 9 hour |
| No enzyme, pH 3 (natural) | 4.9 cm | 50 g | 8.4 g | 8.3 g |
| No enzyme, pH 4.5 | 4.7 cm | 50 g | 9.4 g | 8.3 g |
| No enzyme, pH 5 | 4.4 cm | 50 g | 11.2 g | 9.3 g |
| No enzyme, pH > 6 | 0.5 cm | 220 g | 117.5 g | 57.6 g |
| + Depol™ 793 L, pH 4.5 | 5.0 cm | 220 g | 117.5 g | 57.6 g |
| + Depo™ 793 L, pH > 6 | 0.5 cm | 400 g | 171.2 g | 75.8 g |

The viscosity was measured using a Bostwick consistometer, time fixed to 30 sec and then recording of travelling distance in cm. Measurement carried out when sample cooled to ambient temperature (20.0° C.).

Accordingly, the present invention provides materials that are able to be more easily processed during foodstuff manufacture, preferably during manufacture of chocolate-based confectionery owing to the viscosity reduction.

The chocolate compositions produced using the pretreated cocoa pulps were easier to produce owing to the enzyme treatment providing an ingredient that was easier to handle and process into chocolate products.

Example 12

The cocoa pulp powders from the preparation example above and Examples 5 and 6 were assessed using HPAEC-PAD to determine the sugar contents using the below procedure:

Samples are dissolved in deionised water at a pH above at room temperature, heated at 70° C. for 27 minutes, cooler and centrifuged and a diluted aliquot is prepared. The aliquot is filtered using a 0.2 micron syringe and sugars are separated using an anion exchange polystyrene-divinylbenzene column with aqueous sodium hydroxide as eluent and the eluted carbohydrates are detected using PAD.

| Sugars | Preparation Example 1/ PH16 | Preparation Example 1/ Salobrino | Example 5 | Example 6 |
|---|---|---|---|---|
| DISACCHARIDES | | | | |
| Lactose (g/100 g) | Trace | Trace | Trace | Trace |
| Maltose (g/100 g) | Trace | Trace | Trace | 0.38 |
| Sucrose (g/100 g) | 14.75 | 28.19 | 3.91 | 2.26 |
| MONOSACCHARIDES C6-BODIES | | | | |
| Fructose(g/100 g) | 30.51 | 24.78 | 34.28 | 34.48 |
| Fucose (g/100 g) | Trace | Trace | Trace | Trace |
| Galactose (g/100 g) | Trace | Trace | Trace | Trace |
| Glucose (g/100 g) | 28.94 | 23.12 | 33.24 | 33.47 |
| Rhamnose (g/100 g) | Trace | Trace | Trace | Trace |
| TOTAL SUGAR g/100 g | 74.2 | 76.09 | 71.43 | 70.59 |

The cocoa varieties tested in Examples 5 and 6 are different from those in Preparation Example 1. Additionally, the total sugar content relates to the sugars measured—e.g. does not include any oligosaccharides that may be present.

Additionally, frozen pulp obtained from Ricaeli was dried and assessed as follows.

Total sugars in cocoa pulp samples were measured by high performance anion exchange chromatography with pulsed amperometric detection (HPAEC-PAD). Sugars from samples were extracted in hot water and injected in the HPAEC-PAD system. Neutral sugars being weak acids are partially ionized at high pH and can be separated by anion-exchange chromatography on a base-stable polymeric column (CarboPac PA20). Sugars are detected by measuring the electrical current generated by their oxidation at the surface of a gold electrode.

Total dietary fiber, and its fractions, in cocoa pulp samples were measured by the enzymatic-gravimetric method Rapid Integrated Total Dietary Fiber method as described in *Journal of AOAC International*, Volume 102, Number 1, January-February 2019, pp. 196-207(12).

Proteins content was determined by Kjeldahl which consists in a sulfuric acid digestion to decompose organic compound and libertate nitrogen as ammonia sulfate. It is followed by a distillation in presence of sodium hydroxide to convert ammonium to ammonia. The ammonia content, thus nitrogen is determined by titration. The amount of nitrogen is converted to proteins by multiplying by the conversion factor 6.25.

Lignin content in cocoa pulp was measured with the AACC International Method 32-25.01.

Raw cocoa pulp is predominantly composed by mono- and disaccharides (79% by weight dry matter) and dietary fiber constitutes 6.5% of this pulp tested. Soluble dietary fiber of high molecular weight is the main component of the dietary fiber fraction in raw cocoa pulp followed by the insoluble fiber. These results indicate that cocoa pulp fiber does not contain a significant amount of oligosaccharides given that the average degree of polymerization (DP) of Soluble dietary fiber—High molecular weight is ~12 monosaccharide units (Okhuma et al., 2000. J AOAC Int. Volume 83, Number 4, Pages 1013-1019). In addition, a sample of the freeze-dried powder containing the insoluble fiber and soluble dietary fiber—high molecular weight was subjected to analysis with SEC-MALS. For this analysis, the sample was partially dissolved in DMSO and results indicated an average molecular weight of 9.5 kDa, which translates into DP 50-60.

|  | % dry matter |
|---|---|
| Total Solids | 14 (post-drying) |
| Lactose | n.a. |
| Maltose | 0.2 |
| Sucrose | 0.2 ± 0.2 |
| Glucose | 38.7 ± 0.1 |
| Fructose | 40.2 ± 0.1 |
| Galactose | n.a. |
| Total Sugars | 79.3 |
| Total Dietary Fiber | 6.58 ± 0.04 |
| Insoluble dietary fiber | 2.83 ± 0.15 |
| Soluble dietary fiber—High molecular weight | 3.36 ± 0.12 |
| Soluble dietary fiber—Low molecular weight | 0.39 ± 0.00 |
| Total Protein (N × 6.25) | 3.68 ± 0.3 |
| Citric acid | 9.5 |
| Lignin | 0 |

Example 13

30 g of cocoa pulp from the same source as used in Example 11 was introduced into a Rapid Viscosity Analyser (RVA) aluminium cup and stabilized for 5 min at 40° C. under stirring at 50 rpm. Then, 150 µL of liquid enzyme or 150 mg of enzyme powder was added dependent on the enzyme form. Stirring was increased to 960 rpm for 8 s and went back to 50 rpm, temperature remained at 40° C. Temperature was maintained at 40° C. for additional 45 min prior to increase up to 90° C. for inactivation of the enzyme for 10 min. Average viscosity was calculating the average of the values obtained between time 41 and 49 min of each run. Reduction of viscosity was calculated based on the loss of viscosity versus non-treated sample and was expressed as a percentage.

The polygalacturonase activity was measured at 40° C., hydrolysing polygalacturonic acid (Megazyme P-PGAT) at 5.0 g/ml in 100 mM acetate buffer pH 4.5. Samples were taken out after exactly 2, 4, 6, 8, 10 and 12 min to establish kinetic curves. DNS reagent solution (1% 3,3-dinitrosalicylic acid+1.6% NaOH+40% K Na tartrate tetrahydrate) was immediately added to stop the enzymatic reaction and color the released reducing ends, boiling the samples for 10 min. Finally, the Absorbance was read at 540 nm. Galacturonic acid was used as standard to establish the calibration curve.

Enzyme assay: modified endo-cellulase CellG5 kit procedure from Megazyme. The cellulase activity was measured at 37° C., in 100 mM acetate buffer pH 4.5 containing 1 g/L bovine serum albumin. The enzymatic reaction was stopped after exactly 2, 4, 6, 8, 10 and 12 min to establish kinetic curves, adding 2% TRIS buffer pH 10.0. Finally, the absorbance was read at 405 nm. P-nitrophenol was used as standard to establish the calibration curve. An average of 3 readings was taken.

| Enzyme | Reduction in viscosity/% | Activity/PGN micromole/min/g | Activity/Cellulase/ micromole/min/g |
|---|---|---|---|
| Cellulosin GMY (Ueda) | 96.3 | | 2500 |
| Cellulase FG cone | 93.9 | | 2380 |
| Rapidase ® Fibre (DSM) | 73.3 | 2599 | |
| Pectinex ® Ultra Color (Novozyme) | 72.7 | 10347 | |
| Rohapect ® B1L (AB Enzymes) | 72.4 | | 333 |
| Pectinex ® UF (Novozyme) | 71.7 | 3573 | |
| Pectinex ® Ultra Color (Nozyme) | 71.6 | 9609 | |
| Klerzyme 150 (DSM) | 69.9 | 4342 | |
| Pectinex ® Ultra SP-L (Novozyme) | 69.8 | 3596 | |
| Cellulosin HC (Ueda) | 68.6 | | 514 |
| Hemicellulase cone (Sigma) | 61.3 | | 142 |
| Maxinvert L10000 (DSM) | 4.79 | 0 | 0 |
| Aromase ® (Amano Enzyme Europe) | 1.23 | 41 | 5 |

Example 14

The following studies were carried out. 100 g pouches of frozen cocoa pulp were purchased from Ricaeli. The reference pulp viscosity was 9.5 cm as measured using the Bostwich consistometer set out above. 800 g of pulp at 4.5 pH was used and treated with Pectinex® Ultra SP-L.

| Enzyme Loading/vol % (ml) | Enzyme Treatment time/hour | Temperature/ deg C. | Ca(OH)2 20 w/v % - g/100 ml/ml | Viscosity/ cm | Reduction in viscosity/% |
|---|---|---|---|---|---|
| 0.5 | 0.75 | 30 | 5 | 12 | 28 |
| 0.5 | 3.25 | 30 | 5 | 13 | 38.9 |
| 0.5 | 5.25 | 30 | 5 | 13.5 | 42 |

The above samples were made into chocolate using the same process as Example 1 and Example 11. Upon tasting by a small informal panel, the pre-treatment of the pulp provided a chocolate with quicker melting and lower residence time in the mouth properties, as compared to the non-pre-treated pulp.

Examples 15-19 and Reference Examples E1 to E8

Reference composition E1 was prepared with a composition as follows:

| | |
|---|---|
| Fat (Palm Kernel Oil) | 49.79% |
| Citrus Fibre (Herbacel AQPlus Citrus Fibre) | 16.6% |
| Humectant (Glycerol) | 33.2% |
| Lecithin | 0.41% |

100 g of dry citrus fibre powder was dispersed in 300 g of molten cocoa butter substitute (Palm Kernel Oil) and lecithin 7.5 g at a temperature of 55° C. using a the liquidizer jug attachment of a Kenwood Multi-Pro food processor operating at maximum speed for a duration of 2 minutes.

200 g of glycerol was warmed to 550 C and added slowly and incrementally to the dispersion of fibre with continuous high speed. A homogeneous mix of all four components was made, the glycerol being evenly distributed amongst the dispersion of fibre particles. The total period of mixing during the addition of glycerol was 30 minutes.

The mixture was allowed to cool and solidify at ambient temperature.

Reference Composition E2 was prepared with a composition as follows:

| | |
|---|---|
| Fat (Palm kernel Oil) | 49.79% |
| Citrus Fibre (Herbacel AQPlus Citrus Fibre) | 16.6% |
| Water | 33.2% |
| Lecithin | 0.41% |

100 g of dry citrus fibre powder was dispersed in 300 g of molten cocoa butter substitute (Palm Kernel Oil) and lecithin (7.5 g) at a temperature of 55° C. using a the liquidizer jug attachment of a Kenwood Multi-Pro food processor operating at maximum speed for a duration of 2 minutes.

200 g of water was warmed to 55° C. and added slowly and incrementally to the dispersion of fibre with continuous high speed. A homogeneous mix of all four components was made, the water being evenly distributed amongst the dispersion of fibre particles. The total period of mixing during the addition of water was 30 minutes.

The mixture was allowed to cool and solidify at ambient temperature.

Reference Composition E3 was prepared with a composition as follows:

| | |
|---|---|
| Fat (Palm Kernel Oil) | 49.79% |
| Wheat Fibre (Wheat WF101 Vitacel ® Rettenmair) | 16.6% |
| Humectant (Glycerol) | 33.2% |
| Lecithin | 0.41% |

100 g of dry citrus fibre powder was dispersed in 300 g of molten cocoa butter substitute (Palm Kernel Oil) and lecithin (7.5 g) at a temperature of 55° C. using a the liquidizer jug attachment of a Kenwood Multi-Pro food processor operating at maximum speed for a duration of 2 minutes.

200 g of glycerol was warmed to 55° C. and added slowly and incrementally to the dispersion of fibre with continuous high speed. A homogeneous mix of all four components was made, the water being evenly distributed amongst the dispersion of fibre particles. The total period of mixing during the addition of water was 30 minutes.

The mixture was allowed to cool and solidify at ambient temperature. Reference Composition E4 was prepared with a composition as follows:

| | |
|---|---|
| Fat (Palm Kernel Oil) | 49.79% |
| Wheat Fibre (Wheat WF101 Vitacel ® Rettenmair) | 16.6% |
| Humectant (Glycerol) | 33.2% |
| Lecithin | 0.41% |

100 g of dry wheat fibre powder was dispersed in 300 g of molten cocoa butter substitute (Palm Kernel Oil) and lecithin (7.5 g) at a temperature of 55° C. using a the liquidizer jug attachment of a Kenwood Multi-Pro food processor operating at maximum speed for a duration of 2 minutes.

200 g of glycerol was warmed to 55° C. and added slowly and incrementally to the dispersion of fibre with continuous high speed. A homogeneous mix of all four components was made, the water being evenly distributed amongst the dispersion of fibre particles. The total period of mixing during the addition of water was 30 minutes.

The mixture was allowed to cool and solidify at ambient temperature.

Samples of Chocolate mass were produced by incorporation of E1, E2, E3, E4, into liquid compound [Sugar (44.5%), Palm Kernel oil (27.23%), Skimmed milk powder (22%), cocoa powder (6%), lecithin (0.23%)] at a ratio of Example Compositions:Compound=6:94 w/w. The samples were mixed thoroughly using an overhead mixer with a w-shape paddle, set at 100 RPM for 20 minutes.

Samples of different chocolate analogue masses prepared were moulded into bars and stored at 22° C. and analysed after 22 days.

A "slam test" (mechanical sheer) was performed, and volume change measured as an SRI (shape retention index= (l1×w1)/(l2×w2) where l1 and w1 are the length and width of the bar before heating, and l2 and w2 are the length and width dimensions of the minimal rectangle area that fully contains the sample after heat and mechanical shock test).

Results obtained are reported in below. For the tested samples, a perfect SRI would be 1 and a significantly melted compound only sample SRI would be lower than 0.5.

The technique applied to evaluate the shape and dimensional stability of chocolate subject to high temperatures comprises:

(i) Forming the liquid chocolate samples into bars with standardised dimensions by pouring into moulds of identical dimensions, and allowing to cool and solidify.

(ii) Demoulding the chocolate bars and measuring the dimensions (length×width) of the solid chocolate bar before heating.

(iii) Storage of chocolate bars at ambient conditions for up to 22 days.

(iv) Heating the chocolate bars on a horizontal metal tray to 40° C. for adequate time to fully melt the fat matrix (1 hour heating applied in these tests).

(v) Then subjecting the sample to mechanical shock in the form of repeated forced impact from vertically below by banging on the table. Allowing the chocolate to cool and re-solidify, and then measuring the dimensions of the minimum rectangular area that fully contains the spread of the sample chocolate product after heat treatment.

(vi) Calculation of the shape retention index SRI (l1×w1)/(l2×w2), where l1 and w1 are the length and width of the bar before heating, and l2 and w2 are the length and width dimensions of the minimal rectangle area that fully contains the sample after heat and mechanical shock test

| Samples Identifier | Shape retention index (SRI) |
| --- | --- |
| Bar incorporating Comp E1 | 0.54 |
| Bar incorporating Comp E2 | 0.70 |
| Bar incorporating Comp E3 | 0.74 |
| Bar incorporating Comp E4 | 0.72 |

To show the impact of the present invention the following compositions were produced and chocolate made by the process described previously. The enzyme treatment and pH treatment from Example 14 was repeated with the exception of 2 hours at 45° C. and the necessary alteration of pH treatment. The treated pulps were oven dried to below 5 wt % moisture.

Reference examples using commercial standard chocolates and samples made by using dried apple fibre and cocoa fibres were also tested.

The water content of the dried pulp and the chocolate products was tested using Karl Fischer analysis, Orion 2 Turbo with methanol:formamide 2:1 for the dried pulp and for the chocolate using Karl Fischer Orion AF8 with methanol:hexane 2:1.

| Example | Treated Cocoa pulp/ wt % | Added Sugar wt % | Other Ingredients/ wt % | Cocoa butter/ wt % | Cocoa liquor/ wt % | Pulp pH after treatment | Fat Content/ wt % | Moisture content of chocolate/ wt % | Conditioned- 48 hours at 30° C. | SRI |
| --- | --- | --- | --- | --- | --- | --- | --- | --- | --- | --- |
| Example 15a | 23.5 | 0 | 0 | 0 | Ecuador Arriba-76.5 | 3.5 | 44.8 | Not known | Yes | 0.95 |
| Example 15b | 23.5 | 0 | 0 | 0 | Ecuador Arriba-76.5 | 3.5 | 44.8 | 2.0 | No | 0.82 |
| Example 16a | 23.5 | 0 | 0 | 12.6 | Ivory Coast-63.9 | 4.5 | 50.0 | Not known | Yes | 0.81 |
| Example 16b | 23.5 | 0 | 0 | 12.6 | Ivory Coast-63.9 | 4.5 | 50.0 | 1.8 | No | 0.95 |
| Example 17a | 23.5 | 0 | 0 | 6.4 | Ghana-70.1 | 5.5 | 47.4 | Not known | Yes | 0.84 |
| Example 17b | 23.5 | 0 | 0 | 6.4 | Ghana-70.1 | 5.5 | 47.4 | 2.2 | No | 0.77 |
| Example 18a | 29.75 | 0 | 0 | 8.8 | Ivory Coast-61.4 | 5.5 | 44.8 | Not known | Yes | 0.82 |
| Example 18b | 29.75 | 0 | 0 | 8.8 | Ivory Coast-61.4 | 5.5 | 44.8 | 1.6 | No | 0.74 |
| Example 19a | 36.0 | 0 | 0 | 17.6 | Ghana-46.4 | 4.5 | 44.8 | Not known | Yes | 0.86 |
| Example 19b | 36.0 | 0 | 0 | 17.6 | Ghana-46.4 | 4.5 | 44.8 | 2.0 | No | 0.70 |
| Reference E5 | 0 | 31.95 | Dried apple-17.20, Skim med milk power-15.55, milk fat 3.9 | 17.33 | 13.6 | Not applicable | Not Known | Not known | No | 0.61 |
| Reference E6 | 0 | 31.7 | Cocoa fibres-17.4 Skimmed milk power-15.55 milk fat 3.9 | 17.33 | 13.6 | Not applicable | Not known | Not know | No | 0.45 |

| Example | Treated Cocoa pulp/ wt % | Added Sugar wt % | Other Ingredients/ wt % | Cocoa butter/ wt % | Cocoa liquor/ wt % | Pulp pH after treatment | Fat Content/ wt % | Moisture content of chocolate/ wt % | Conditioned- 48 hours at 30° C. | SRI |
|---|---|---|---|---|---|---|---|---|---|---|
| Commercial Reference E7a-70% | 0 | 29 | 0 | Not known | Not known | Not applicable | 41 | Not known | Yes | 0.44 |
| Commercial Reference E7b-70% cocoa | 0 | 29 | 0 | Not known | Not known | Not applicable | 41 | 0.7 | No | 0.47 |
| Commercial Reference E8a-70% | 0 | 28 | 0 | Not known | Not known | Not applicable | 44 | Not known | Yes | 0.43 |
| Commercial Reference E8b-70% | 0 | 28 | 0 | Not know | Not known | Not applicable | 44 | 0.6 | No | 0.41 |

The results clearly show the impact of known tropicalization methods but show the need for addition of humectants/water and additional substrates.

However, the present invention provides superior or comparable properties in respect of heat stability without the need for addition of humectants.

Example 20

Figure 4:
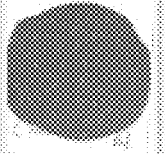

FIG. 4 displays the results of bloom development in the heat shocked chocolate from Example 15b versus Reference E8b. As can be seen by visual inspection, the present invention provides a significant reduction in bloom development as compared to the commercial reference sample.

Figure 5A:
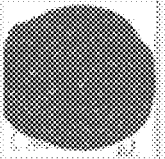
Figure 5A:
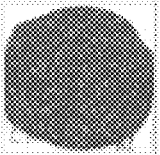
Figure 5A:
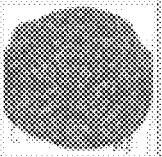
Figure 5A:
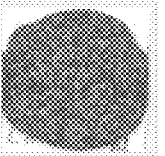
Figure 5B:
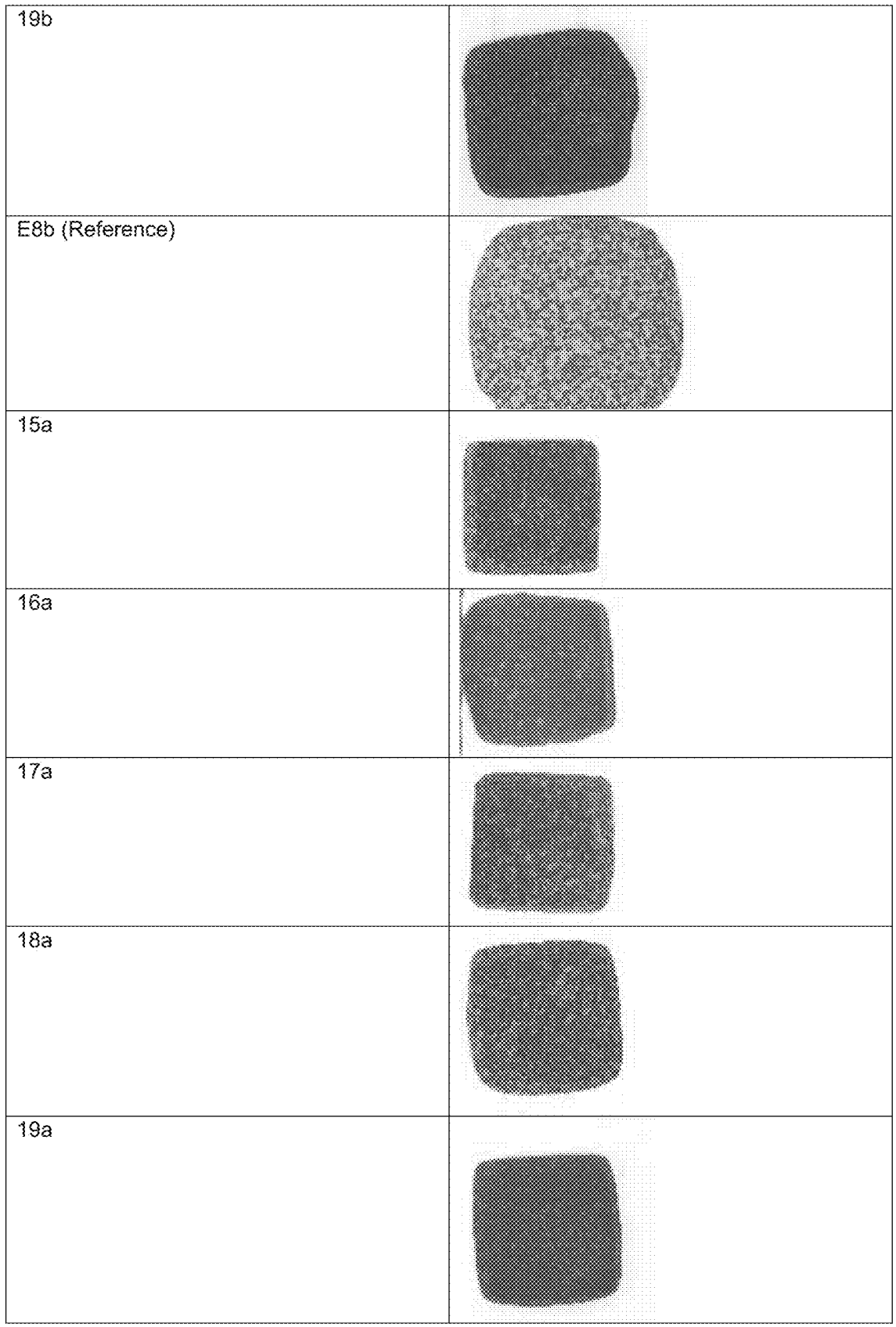

Additionally, further studies based on Examples 15-19a, after 18 days, and Examples 15-19b, after 22 days, were carried out to assess bloom. It was found that the bloom onset was delayed further by increasing the amount of dried, treated cocoa pulp (FIGS. 5A and 5B).

Accordingly, as well as providing heat stability, the compositions used in the present invention provide an improvement in the onset of bloom in heat shocked chocolates. It is considered that this advantage extends to non-heat shocked chocolates also, as the heat shock will potentially accelerate onset of bloom.

The invention claimed is:

1. A chocolate product comprising pulp from a plant in the *theobroma* genus or an extract of pulp from a plant in the *theobroma* genus, wherein
the pulp or extract of the pulp comprises a sugar component between 20.0% and 85.0% by weight based on the total weight of the pulp or extract of the pulp, the sugar component comprises monosaccharides, disaccharides and oligosaccharides, the sugar component comprises less than 90.0% by weight of glucose and fructose based on the total weight of the sugar component, and the pulp or extract of the pulp has been treated with a pectinase and/or a cellulase to reduce the polysaccharide content and treated to adjust the pH to between 4.0 and 7.0; and
the chocolate product comprises the pulp or extract of the pulp between 15% and 65% by weight based on the total weight of the chocolate product.

2. The chocolate product of claim 1, wherein the pulp or extract of the pulp is cocoa pulp or an extract of the cocoa pulp.

3. The chocolate product of claim 1, wherein the pulp or extract of the pulp is dried.

4. The chocolate product of claim 3, wherein the dried pulp or extract of the pulp comprises the sugar component between 65% and 85% by weight based on the total weight of the dried pulp or extract of the pulp.

5. The chocolate product of claim 1, wherein the pulp or extract of the pulp is in the form of a powder.

6. The chocolate product of claim 1, wherein the pulp or extract of the pulp comprises dietary fibre between 0.25% and 30.0% by weight based on the total weight of the pulp or extract of the pulp.

7. The chocolate product of claim 1, wherein the pulp or extract of the pulp is dispersed within a continuous fat phase of the chocolate product.

8. The chocolate product of claim 1, wherein the chocolate product comprises a cocoa mass.

* * * * *